US008390905B2

(12) United States Patent
Kondo et al.

(10) Patent No.: US 8,390,905 B2
(45) Date of Patent: Mar. 5, 2013

(54) IMAGE PROCESSING DEVICE EXTRACTING DESIRED REGION TO BE USED AS MODEL FOR IMAGE CORRECTION

(75) Inventors: Masaki Kondo, Toyoake (JP);
Tomohiko Hasegawa, Nagoya (JP)

(73) Assignee: Brother Kogyo Kabushiki Kaisha,
Aichi-Ken, Nagoya-Shi (JP)

( * ) Notice: Subject to any disclaimer, the term of this patent is extended or adjusted under 35 U.S.C. 154(b) by 681 days.

(21) Appl. No.: 12/200,472

(22) Filed: Aug. 28, 2008

(65) Prior Publication Data

US 2009/0244564 A1    Oct. 1, 2009

(30) Foreign Application Priority Data

Aug. 31, 2007   (JP) ................. 2007-226585

(51) Int. Cl.
G03F 3/08 (2006.01)
H04N 1/60 (2006.01)
H04N 1/46 (2006.01)
G06K 9/00 (2006.01)
(52) U.S. Cl. .......... 358/518; 358/1.9; 358/540; 382/167
(58) Field of Classification Search .................. 358/1.9, 358/518, 520, 523, 537, 538, 540, 468, 453, 358/462, 463, 527, 533; 382/167, 162, 164, 382/282, 274
See application file for complete search history.

(56) References Cited

U.S. PATENT DOCUMENTS

| | | | |
|---|---|---|---|
| 5,023,708 A * | 6/1991 | Maruyama et al. | 358/540 |
| 5,210,600 A | 5/1993 | Hirata | |
| 5,459,589 A | 10/1995 | Ohnishi et al. | |
| 5,539,426 A | 7/1996 | Nishikawa et al. | |
| 5,680,230 A | 10/1997 | Kaburagi et al. | |
| 5,734,802 A * | 3/1998 | Maltz et al. | 358/1.9 |
| 5,764,380 A | 6/1998 | Noguchi | |
| 5,805,308 A | 9/1998 | Tanaka et al. | |

(Continued)

FOREIGN PATENT DOCUMENTS

EP    1 648 158 A1    4/2006
JP    H05-119752    5/1993

(Continued)

OTHER PUBLICATIONS

Web-page from the SITEMAKER website, together with English translation, May 11, 2007, http://www.nl-sitemaker.com/cgi-bin/nextone/sitemaker.cgi?mode=page=page2&category=4.

(Continued)

*Primary Examiner* — Madelein A Nguyen
(74) *Attorney, Agent, or Firm* — Scully, Scott, Murphy & Presser, P.C.

(57) ABSTRACT

An image processing device includes a first image inputting unit, a second image inputting unit, a first partial image extracting unit, a first characteristic quantity data determining unit, a second characteristic quantity data determining unit, and a correcting unit. The first image inputting unit inputs a first image. The second image inputting unit inputs a second image The first partial image extracting unit extracts a desired region of the first image as a first partial image. The first characteristic quantity data determining unit determines first characteristic quantity data based on the first partial image. The second characteristic quantity data determining unit determines second characteristic quantity data based on the second image. The correcting unit corrects the second image based on the first characteristic quantity data and the second characteristic quantity data.

19 Claims, 16 Drawing Sheets

U.S. PATENT DOCUMENTS

| | | | |
|---|---|---|---|
| 5,940,530 A | 8/1999 | Fukushima et al. | |
| 6,072,914 A * | 6/2000 | Mikuni | 382/284 |
| 6,333,752 B1 | 12/2001 | Hasegawa et al. | |
| 6,473,198 B1 * | 10/2002 | Matama | 358/1.9 |
| 6,646,760 B1 | 11/2003 | Hanihara | |
| 6,757,427 B1 | 6/2004 | Hongu | |
| 6,801,334 B1 | 10/2004 | Enomoto | |
| 6,922,261 B2 | 7/2005 | Asano | |
| 6,958,825 B2 * | 10/2005 | Yamazaki | 358/1.16 |
| 7,145,597 B1 | 12/2006 | Kinjo | |
| 7,215,792 B2 * | 5/2007 | Sharma et al. | 382/100 |
| 7,283,247 B2 | 10/2007 | Okawa et al. | |
| 7,308,155 B2 | 12/2007 | Terada | |
| 7,349,119 B2 * | 3/2008 | Tsukioka | 358/1.18 |
| 7,508,550 B2 | 3/2009 | Kameyama | |
| 7,729,013 B2 * | 6/2010 | Nishida | 358/2.1 |
| 7,742,194 B2 * | 6/2010 | Fujiwara | 358/1.9 |
| 7,903,307 B2 * | 3/2011 | Dai et al. | 358/540 |
| 8,159,716 B2 * | 4/2012 | Kondo et al. | 358/1.9 |
| 8,174,731 B2 * | 5/2012 | Hasegawa et al. | 358/3.24 |
| 8,264,751 B2 * | 9/2012 | Matsui | 358/488 |
| 2002/0060796 A1 | 5/2002 | Kanno et al. | |
| 2002/0159083 A1 * | 10/2002 | Arai et al. | 358/1.9 |
| 2003/0031375 A1 | 2/2003 | Enomoto | |
| 2003/0091229 A1 | 5/2003 | Edge et al. | |
| 2003/0128379 A1 | 7/2003 | Inoue | |
| 2003/0164967 A1 * | 9/2003 | Norimatsu | 358/1.9 |
| 2003/0193582 A1 | 10/2003 | Kinjo | |
| 2004/0036892 A1 | 2/2004 | Ito et al. | |
| 2004/0075854 A1 * | 4/2004 | Yamazaki | 358/1.9 |
| 2004/0212808 A1 | 10/2004 | Okawa et al. | |
| 2004/0240749 A1 * | 12/2004 | Miwa et al. | 382/274 |
| 2005/0152613 A1 | 7/2005 | Okutsu | |
| 2005/0220347 A1 | 10/2005 | Enomoto et al. | |
| 2006/0001928 A1 | 1/2006 | Hayaishi | |
| 2006/0074861 A1 | 4/2006 | Wilensky | |
| 2006/0109529 A1 * | 5/2006 | Shimazawa | 358/540 |
| 2006/0140477 A1 | 6/2006 | Kurumisawa et al. | |
| 2006/0187477 A1 | 8/2006 | Maki et al. | |
| 2006/0238827 A1 | 10/2006 | Ikeda | |
| 2006/0256410 A1 | 11/2006 | Koie et al. | |
| 2006/0257041 A1 | 11/2006 | Kameyama et al. | |
| 2006/0291017 A1 | 12/2006 | Moran et al. | |
| 2007/0019260 A1 * | 1/2007 | Tokie | 358/540 |
| 2007/0070436 A1 | 3/2007 | Iwaki | |
| 2007/0080973 A1 | 4/2007 | Stauder et al. | |
| 2007/0177029 A1 | 8/2007 | Wada et al. | |
| 2007/0206206 A1 | 9/2007 | Kondo et al. | |
| 2007/0292038 A1 | 12/2007 | Takemoto | |
| 2008/0002216 A1 | 1/2008 | Matsushima | |
| 2008/0239410 A1 * | 10/2008 | Hashii et al. | 358/462 |
| 2008/0259181 A1 * | 10/2008 | Yamashita et al. | 348/229.1 |
| 2009/0059251 A1 * | 3/2009 | Kondo et al. | 358/1.9 |
| 2009/0059256 A1 * | 3/2009 | Hasegawa et al. | 358/1.9 |
| 2009/0060364 A1 * | 3/2009 | Kondo et al. | 382/254 |
| 2009/0128871 A1 | 5/2009 | Patton et al. | |
| 2009/0244564 A1 * | 10/2009 | Kondo et al. | 358/1.9 |
| 2010/0033745 A1 | 2/2010 | Dai et al. | |

FOREIGN PATENT DOCUMENTS

| | | |
|---|---|---|
| JP | H05-300531 | 11/1993 |
| JP | 5-342344 A | 12/1993 |
| JP | 6-133329 | 5/1994 |
| JP | 7-177366 A | 7/1995 |
| JP | 7-312720 A | 11/1995 |
| JP | H09-116740 | 5/1997 |
| JP | H09-172553 | 6/1997 |
| JP | H09-284583 | 10/1997 |
| JP | 9-325536 | 12/1997 |
| JP | 10-173947 | 6/1998 |
| JP | H10-149441 | 6/1998 |
| JP | H11-098374 | 4/1999 |
| JP | H11-185034 | 7/1999 |
| JP | H11-196258 | 7/1999 |
| JP | 2000-106623 | 4/2000 |
| JP | 2000-152268 | 5/2000 |
| JP | 2000-196904 A | 7/2000 |
| JP | 2001-051062 | 2/2001 |
| JP | 2001-061062 | 3/2001 |
| JP | 2001-136313 | 5/2001 |
| JP | 2001-160908 | 6/2001 |
| JP | 2002-171408 | 6/2002 |
| JP | 2003-108987 | 4/2003 |
| JP | 2003-187215 | 7/2003 |
| JP | 2003-296723 | 10/2003 |
| JP | 2004-007370 | 1/2004 |
| JP | 2004-054751 | 2/2004 |
| JP | 2004-343365 | 12/2004 |
| JP | 2004-350212 | 12/2004 |
| JP | 2005-182143 A | 7/2005 |
| JP | 2005-192158 | 7/2005 |
| JP | 2005-197996 | 7/2005 |
| JP | 2005-202469 | 7/2005 |
| JP | 2005-242535 | 9/2005 |
| JP | 2005-309651 | 11/2005 |
| JP | 2006-80746 | 3/2006 |
| JP | 2006-121695 | 5/2006 |
| JP | 2006-229537 | 8/2006 |
| JP | 2006-229811 A | 8/2006 |
| JP | 2006-303899 | 11/2006 |
| JP | 2007-89179 | 4/2007 |
| JP | 2007-208413 | 8/2007 |
| WO | WO 2006/036027 A1 | 4/2006 |

OTHER PUBLICATIONS

Web-page from a personal website, namely 'kappa teki denou kukkan', together with English translation, Apr. 12, 2001, http://kapp.cool.ne.jp/howto/cg/comic6.htm.

Manual for Epson Colorio PM-D770, together with English translation, Oct. 7, 2004.

Manual for CANOSCAN 8400F, together with English translation, Jul. 18, 2004.

Web-page from Hiroshima Prefecture Website, together with English translation, Mar. 31, 2005, http://www.work2.prefhiroshima.jp/soho/a/a08/a08061.html.

Japanese Official Action dated Sep. 8, 2009 with English translation.

Japanese Official Action dated Aug. 25, 2009 with English translation.

Japanese Office Action issued in Patent Application No. JP 2007-226090 on Apr. 12, 2011 together with English language translation from related application U.S. Appl. No. 12/202,986.

Japanese Official Action dated Jun. 7, 2011 together with an English language translation from JP 2007-226584 received in related U.S. Appl. No. 12/202,872, filed Sep. 2, 2008.

Japanese Official Action dated Jun. 7, 2011 together with an English language translation from JP 2007-226586 received in related U.S. Appl. No. 12/202,872, filed Sep. 2, 2008.

U.S. Official Action dated Apr. 14, 2011 from related U.S. Appl. No. 12/202,971.

U.S. Official Action dated Apr. 18, 2011 from related U.S. Appl. No. 12/202,872.

U.S. Official Action dated May 18, 2011 from related U.S. Appl. No. 12/202,986.

United States Office Action dated Jul. 25, 2011 received in related U.S. Appl. No. 12/194,680.

Official Action dated May 31, 2011 received from the Japanese Patent Office from related Japanese Application No. JP 2007-226091 and U.S. Appl. No. 12/194,680, together with a partial English-language translation.

United States Office Action dated Apr. 25, 2012 in related U.S. Appl. No. 12/202,885.

United States Office Action dated Mar. 15, 2012 in related U.S. Appl. No. 12/202,986.

Japanese Official Action dated Aug. 9, 2011 from related application JP 2007-226088 and U.S. Appl. No. 12/202,872 together with an English-language translation.

United States Office Action dated Oct. 25, 2011 in related U.S. Appl. No. 12/202,986.

United States Office Action dated Oct. 14, 2011 in related U.S. Appl. No. 12/202,872.

United States Office Action dated Oct. 20, 2011 in related U.S. Appl. No. 12/202,885.

Notice of Allowance dated Jul. 2, 2012 in related U.S. Appl. No. 12/202,986.

* cited by examiner

FIG.12A
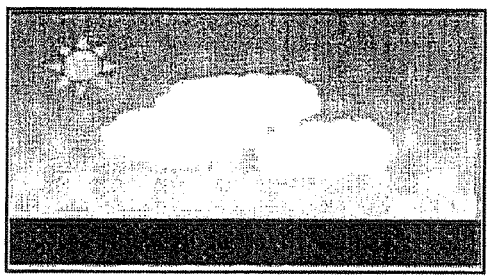
(IMAGE WITH PHOTOGRAPH AREA)
STANDARD DEVIATION: 61.7
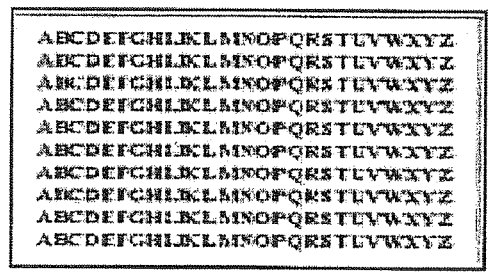
(IMAGE WITH TEXT AREA)
STANDARD DEVIATION: 71.7
FIG.12B
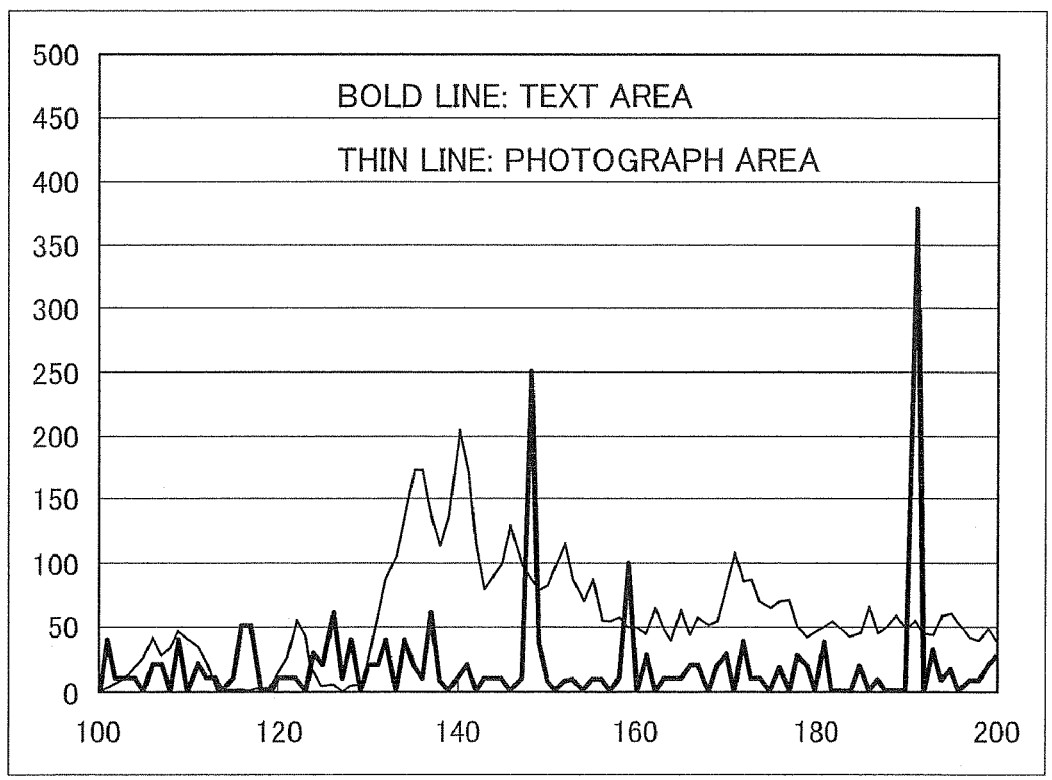

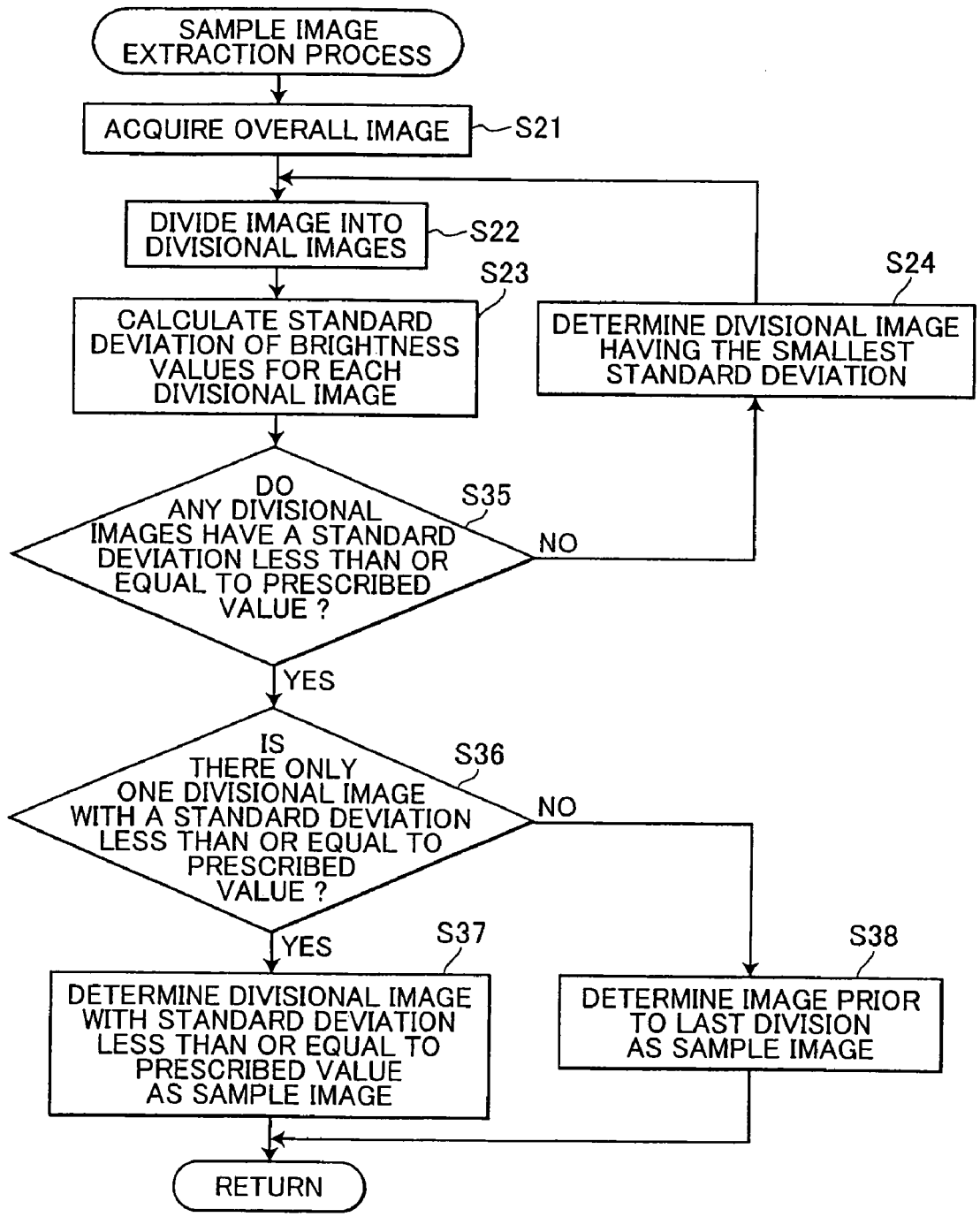

HUE CORRECTION TABLE

COLOR HUE-REGION 1    COLOR HUE-REGION 2

IMAGE PROCESSING DEVICE EXTRACTING DESIRED REGION TO BE USED AS MODEL FOR IMAGE CORRECTION

CROSS REFERENCE TO RELATED APPLICATION

This application claims priority from Japanese Patent Application No. 2007-226585 filed Aug. 31, 2007. The entire content of this priority application is incorporated herein by reference.

TECHNICAL FIELD

The present invention relates to an image processing device and a method of image processing for performing image correction through simple operations.

BACKGROUND

As digital cameras and the like have become popular, it has become commonplace for users to print images they themselves have taken on a home printer, and to print (duplicate) images stored in a printing medium on a home printer. if the acquired images do not have the desired colors or tones in such cases, it is preferable to perform image correction on the images prior to printing.

Japanese unexamined patent application publication No. 2007-89179, for example, discloses a printing device capable of calibrating an image. This printing device requires the input of calibration data for calibrating the quality of an acquired image.

SUMMARY

Since specific data must be inputted for calibrating images with the printing device described above, the user must have technical knowledge of the image; in other words, the user cannot perform sensory color adjustments (adjustments made based on the user's instincts or visual impression). Further, the user must select and specify calibration data in the above printing device, requiring more complex operations. Here, it is possible co allow the user to select a sample image to be used for color correction, but it is desirable to simplify the operations for selecting the sample image and necessary to minimize the amount of memory required for storing the sample images.

In view of the foregoing, it is an object of the present invention to provide an image processing device and a method of image processing that enable a user to perform desired image correction instinctively through simple operations.

In order to attain the above and other objects, the invention provides an image processing device includes a first image inputting unit, a second image inputting unit, a first partial image extracting unit, a first characteristic quantity data determining unit, a second characteristic quantity data determining unit, and a correcting unit. The first image inputting unit inputs a first image. The second image inputting unit inputs a second image. The first partial image extracting unit extracts a desired region of the first image as a first partial image. The first characteristic quantity data determining unit determines first characteristic quantity data based on the first partial image. The second characteristic quantity data determining unit determines second characteristic quantity data based on the second image. The correcting unit corrects the second image based on the first characteristic quantity data and the second characteristic quantity data.

According to another aspect, the present invention provides an image processing method comprising: inputting a first image; inputting a second image; extracting a desired region of the first image as a first partial image; determining first characteristic quantity data based on the first partial image; determining second characteristic quantity data based on the second image; and correcting the second image based on the first characteristic quantity data and the second characteristic quantity data.

According to another aspect, the present invention provides a computer-readable recording medium that stores an image data processing program, the data processing program including instructions for: inputting a first image; inputting a second image; extracting a desired region of the first image as a first partial image; determining first characteristic quantity data based on the first partial image; determining second characteristic quantity data based on the second image; and correcting the second image based on the first characteristic quantity data and the second characteristic quantity data.

BRIEF DESCRIPTION OF THE DRAWINGS

The particular features and advantages of the invention as well as other objects will become apparent from the following description taken in connection with the accompanying drawings, in which:

FIG. 12A is an explanatory diagram showing an image with a photograph area and an image with a text area together with their standard deviations for brightness values;

FIG. 12B is a histogram of brightness values in the photograph image and text image;

FIG. 13 is a flowchart illustrating steps in a sample image extraction process according to a third embodiment;

DETAILED DESCRIPTION

Figure 1:
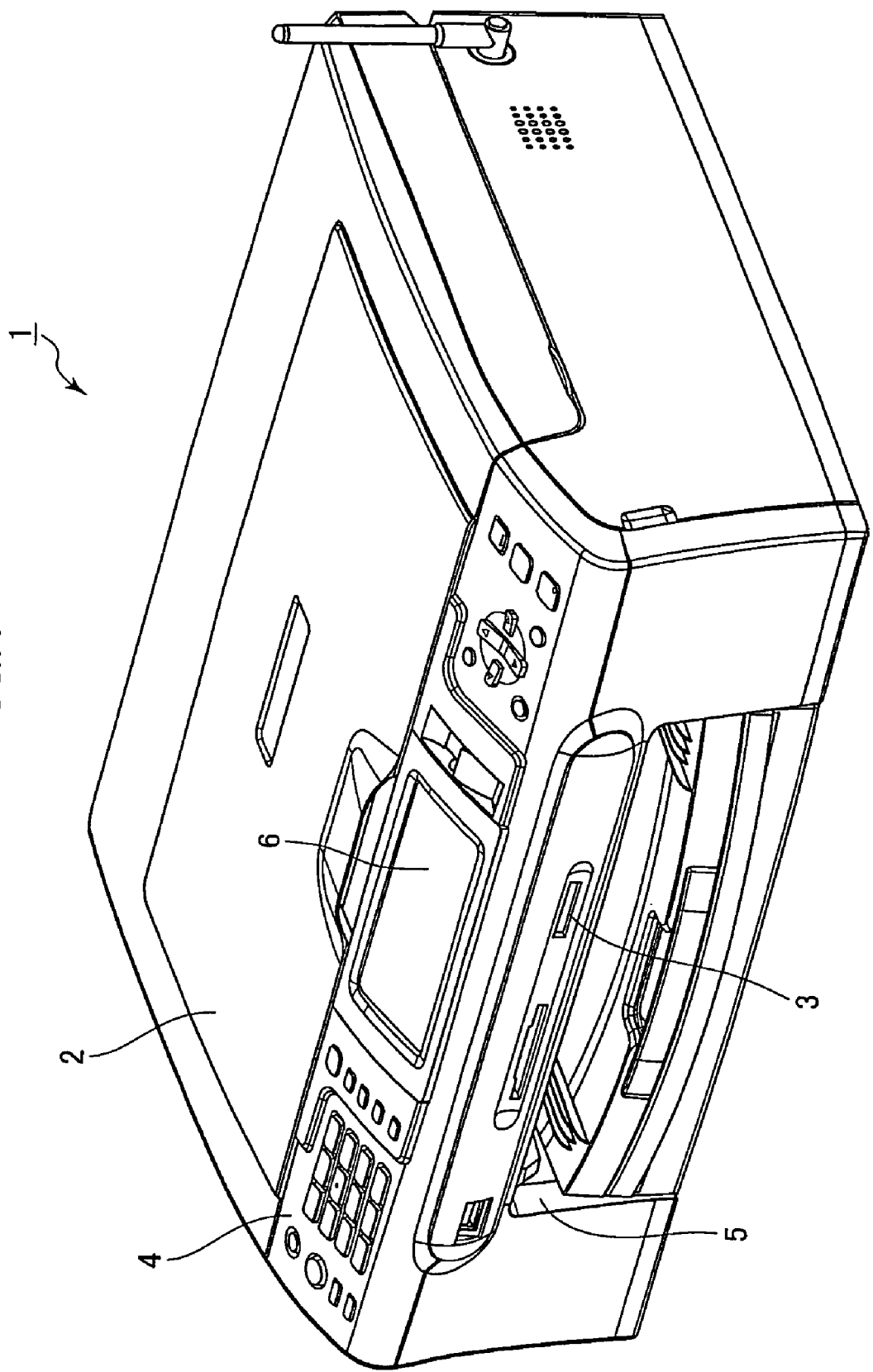
FIG. 1 is a perspective view showing the external appearance of an image processing device according to a first embodiment of the present invention.
Figure 2:
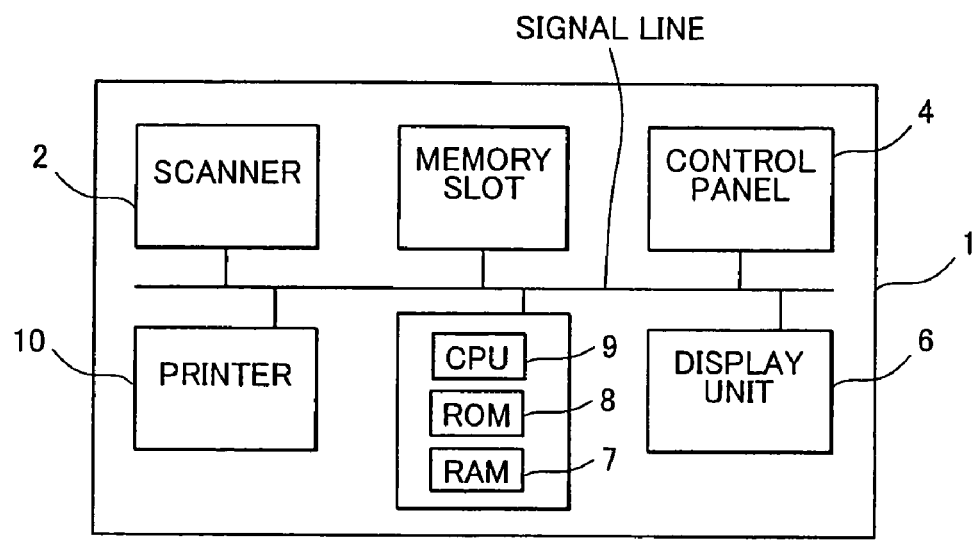
FIG. 2 is a block diagram illustrating the general structure of a control system in the image processing device.

FIG. 1 shows an example exterior of an image processing device 1 according to a first embodiment of the present invention. FIG. 2 shows an example internal structure of the image processing device 1.

The image processing device 1 according to the first embodiment is a multifunction printer having a scanner 2 for reading image data from a photograph or the like placed thereon. The scanner 2 in FIG. 1 is in a covered state. Image data read by the scanner 2 is used as sample data for correcting hues and the like in image data read from a memory slot described later. This process of image correction will be described in detail below.

The image processing device 1 has a memory slot 3 functioning as an IC card reader for reading image data stored in external memory. The external memory is a storage medium, such as an SD Card (registered trademark) or a CompactFlash Card (registered trademark). Here, a desirable medium and format well known in the art may be used as the external memory. Alternatively, the memory slot 3 may be configured of a plurality of memory slots supporting a plurality of media types. By adding, to the signal line that is connected to a CPU 9, ROM 8, and RAM 7 shown in FIG. 2, a communication function (a LAN card, for example; not shown) that is capable of connecting the image processing device 1 to a LAN or other network to which is also connected a personal computer (PC) storing image data, the image processing device 1 may be configured to read desired image data from the PC connected to the network instead of from the external memory.

The image processing device 1 also has a control panel 4 enabling the user to perform various operations. The control panel 4 includes various buttons.

As shown in FIG. 2, the image processing device 1 also has a printer 10. The printer 10 prints image data on paper or the like after the data has undergone image correction. After images are printed on the paper, the paper is discharged through a discharge opening 5 shown in FIG. 1, for example.

The image processing device 1 also has a display unit 6 for displaying various text and images A transparent touch panel may be provided over the surface of the display unit 6 for implementing part or all of the functions of the control panel 4. The image processing device 1 may also combine the touch panel and the control panel 4.

The image processing device 1 is further provided with the CPU 9 for controlling overall operations of the image processing device 1, the RAM 7 for temporarily storing data, the ROM 8 storing prescribed data, and, when necessary, a hard disk drive or other large-capacity storage device (not shown).

All of the components described above are interconnected via a signal line.

Other functions, such as a facsimile function, may also be added to the image processing device 1, as well as an interface for connecting the image processing device 1 to a personal computer or the like and an interface for connecting the image processing device 1 to another printing device.

It should be apparent that the exterior of the image processing device 1 described above is merely an example, and the present invention is not limited to such an exterior. Further, while all functions described above are integrally provided in a single device in the drawings, some of these functions may be implemented in an external device It should also be apparent that the internal structure of the image processing device 1 described above is merely an example, and the present invention is not limited to this internal structure.

Figure 3:
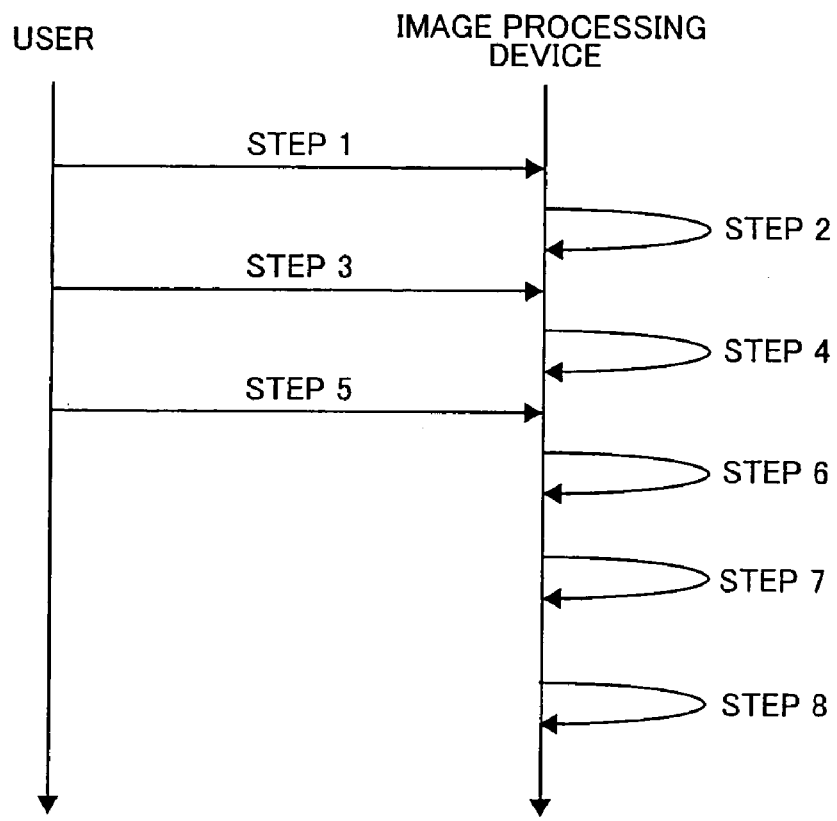
FIG. 3 is an explanatory diagram showing an overview of user operations and resulting processing on the image processing device in a color correction process.

Next, a color correction process performed on the image processing device 1, including an overview of user operations and the resulting processes performed by the image processing device 1, will be described with reference to FIG. 3. As shown in FIG. 3, the user first inserts a storage medium in the memory slot 3 of the image processing device 1 (step 1). As described above, this memory is configured of a memory card or other storage medium well known in the art and stores images that are candidates for image correction.

After the user has inserted a memory card into the memory slot 3, tie image processing device 1 recognizes this memory card and prompts the user to select an image to be corrected from among the images stored in this memory (step 2). Any suitable technique known in the art may be used for selecting an image, such as a method of sequentially scrolling and selecting the desired image. The user may also use the touch panel on the display unit 6 to select an image at this time.

After the user has specified an image to be corrected (step 3), the image processing device 1 reads this image from memory and writes the image data to the RAM 7, for example (step 4). Hereafter, this image will be referred to as the "original image."

Next, after the user places a document on a document-supporting surface of the scanner 2, the scanner 2 of image processing device 1 scans the document and reads, from the document, an overall image that includes a sample image to be used as a model for image correction (step 5) and presses a prescribed button or the like. In response, the image processing device 1 writes the overall image to the RAM 7, for example (step 6).

Next, the image processing device 1 extracts the sample image from the image scanned by the scanner 2 (step 7). The process for extracting the sample image will be described later.

Next, the image processing device 1 performs an image correction process described later on the original image read from memory based on the sample image scanned by the scanner 2 (step B).

In this color correction process, the image processing device 1 reads a sample image using the scanner 2 after reading an original image from the RAM 7, but the image processing device 1 may be configured to read the original image from the RAM 7 after first reading a sample image with the scanner 2.

Next, a detailed description of the color correction process executed on the image processing device 1 will be given.

Figure 4:
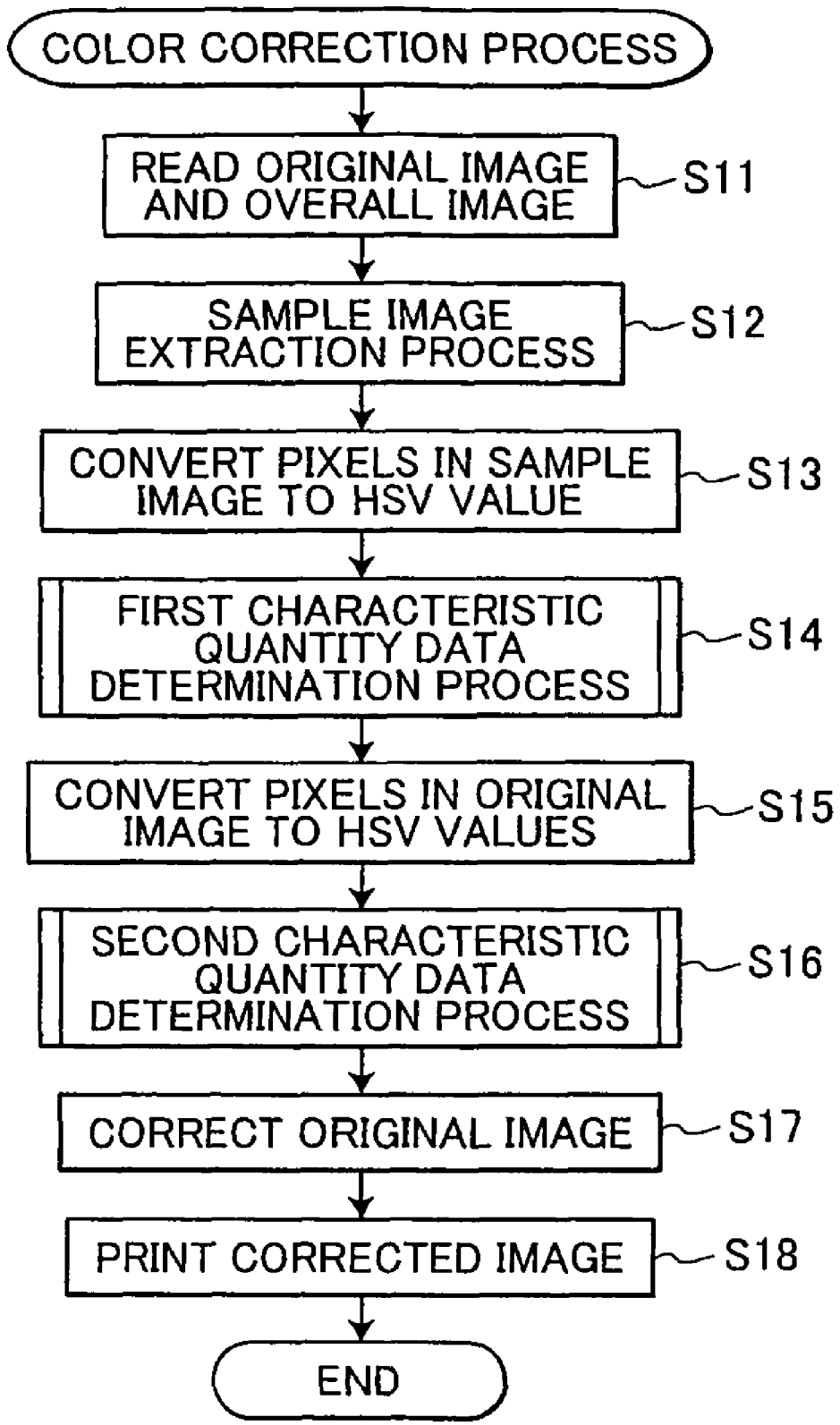
FIG. 4 is a flowchart illustrating steps in the color correction process.

FIG. 4 is a flowchart illustrating steps in the color correction process executed by the CPU 9 of the image processing device 1. In S11 at the beginning of this color correction process, the CPU 9 reads an original image and an overall image to the RAM 7. In this embodiment, the format for the read image data is the RGB format, but the present invention is not limited to this format.

In S12 the CPU 9 performs a sample image extraction process for generating the sample image by extracting from the overall image.

Figure 5A:
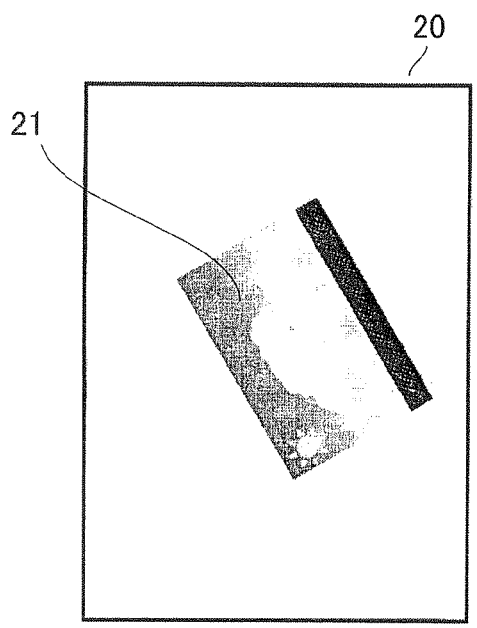
FIG. 5A is an explanatory diagram showing an example of an overall image.
Figure 5B:
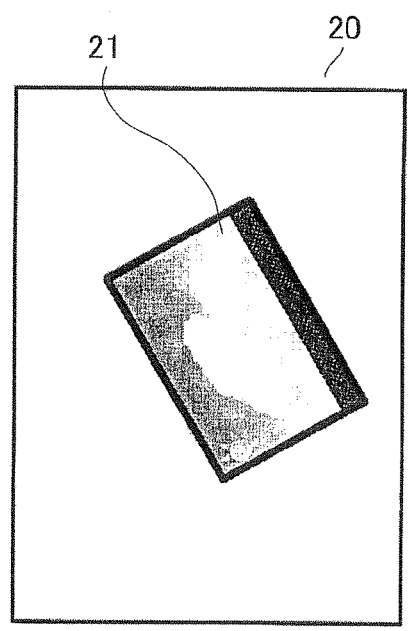
FIG. 5B is an explanatory diagram showing an example of a sample image in the overall image shown in FIG. 5A.
Figure 6A:
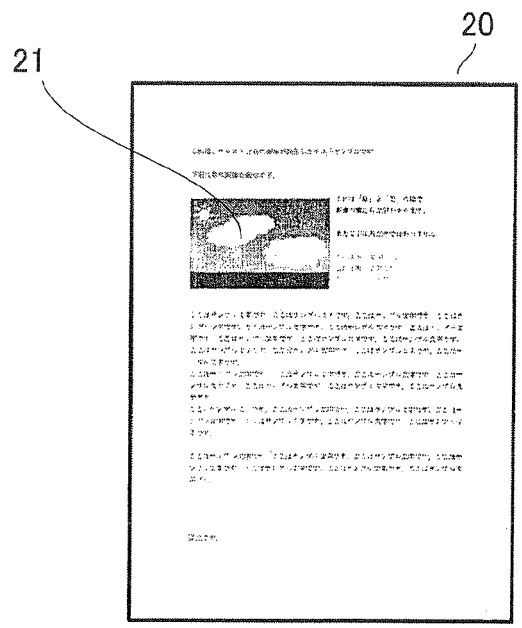
FIG. 6A is an explanatory diagram showing another example of an overall image.
Figure 6B:
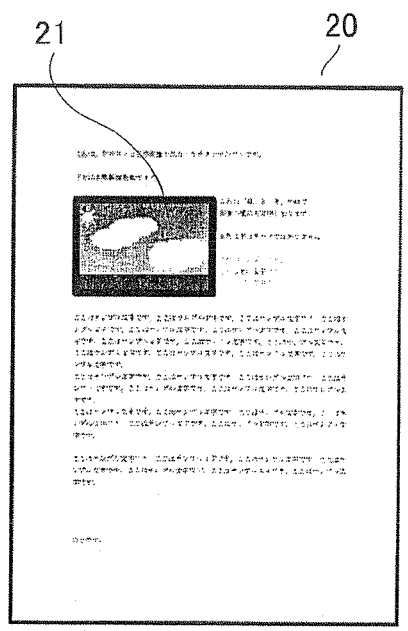
FIG. 6B is an explanatory diagram showing an example of a sample image in the overall image shown in FIG. 6A.

Next, the sample image extraction process will be described. FIGS. 5A and 6A show examples of an overall image 20 scanned on the scanner 2 in the process of S11. In the example of FIG. 5A, the sample image 21 occupies a portion of the overall image 20. In the example of FIG. 6A, the sample image 21 is combined with text in the overall image 20.

in order to perform the color correction process quickly and accurately, it is necessary to extract only the sample image 21 indicated by bold lines in FIGS. 5B and 6B, rather than the entire part of overall image 20. In other words, the object of the image process must be limited to the sample image 21. Accordingly, if the overall image 20 shown in FIG. 5A has been read, it is possible to set the sample image 21 to a set of pixels having brightness values less than a prescribed value (such as 97 when there are 256 gradations) from all pixels in the overall image 20, for example. In other words, the overall image 20 shown in FIG. 5A can be processed so that white areas in the overall image 20 (i.e., areas with a high brightness value) are not included in the sample image 21.

When the overall image 20 shown in FIG. 6A has been read, any of the various techniques well known in the art may be used for extracting the area with a photograph from the image of the document, to thereby extract the sample image 21.

In S13 of FIG. 4, the CPU 9 performs a process to convert each pixel in the sample image 21 extracted in S12 to HSV parameters, where H is a value from 0 to 360 and S and V are values between 0 and 1.

Next, the process for converting pixels to HSV parameters will be described. When the sample image 21 is acquired as RGB parameters, the RGB parameters for each pixel may be converted to HSV parameters according to the following equations. However, the following conversion equation is merely an example, and the image processing device 1 may perform conversion according to another method.

Method of RGB→HSV Conversion

First, the value "V" is calculated by the following formula:

$$V=\max(R\div255, G\div255, B\div255),$$

wherein max(a, b, c) denotes the largest value among a, b, and c.

Based on the determined value "V", the value "S" is calculated by the following formulas:

when V is 0, S=0; and when V is not 0, $S=(V-\min(R\div255, G\div255, B\div255)\div V,$ wherein min(a, b, c) denotes the smallest value among a, b, and c.

Based on the value "V", the value "r", "g", and "b" are determined by the following formulas:

when $\{V-\min(R\div255, G\div255, B\div255)\}$ is not 0, $r=(V-R\div255)\div(V-\min(R\div255, G\div255, B\div255),$ $g=(V-G\div255)\div(V-\min(R\div255, G\div255, B\div255),$ $b=(V-B\div255)\div(V-\min(R\div255, G\div255, B\div255);$ and when $(V-\min(R\div255, G\div255, B\div255))$ is 0, r=0, g=0, b=0.

Based on the values "r", "g", and "b", the value "H" is calculated by the following formulas:

when $V=R\div255, H=60\times(b-g);$ when $V=G\div255, H=60\times(2+r-g);$ and when $V=B\div255, H=60\times(4+g-r).$ In S14 the CPU 9 performs a first characteristic quantity data determination process for determining a set of first characteristic quantity data representing a characteristic of the sample image 21 based on the HSV parameters extracted in the conversion process of S13 from the sample image 21.

Figure 7:
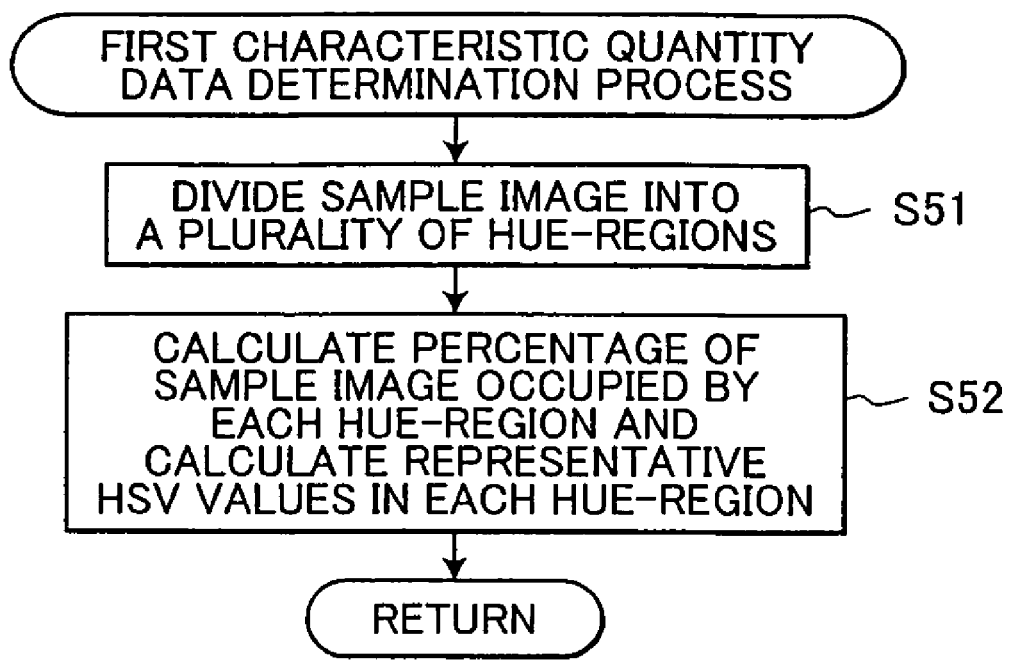
FIG. 7 is a flowchart illustrating steps in a first characteristic quantity data determination process.

FIG. 7 is a flowchart illustrating steps in the first characteristic quantity data determination process. In the following process, it will be assumed that H takes on a value of at least −30 and less than 330. When H does not fall within this range, H is adjusted to a value within the range according to a suitable conversion, such as H=H÷360×n or H=H−360×n, where n is an integer.

In S51 of the first characteristic quantity data determination process, the CPU 71 divides the sample image 21 into a plurality of hue-regions (six commonly used hue regions in this example). Specifically, each of the pixels in the sample image 21 is allocated into either one of the following six hue-regions based on its R value:

R hue-region: grater than or equal to −30 and less than 30
Y hue-region: grater than or equal to 30 and less than 90
G hue-region: grater than or equal to 90 and less than 150
C hue-region: grater than or equal to 150 and less than 210
B hue-region: grater than or equal to 210 and less than 270
H hue-region: grater than or equal to 270 and less than 330

Hence, the CPU 9 performs a process to sort all the pixels of the sample image 21 into six classifications based on the above classification criteria for the hue value. The correspondence between each hue-region and the H value given above is merely an example and may be modified as appropriate.

In S52 the CPU 9 calculates representative values (HSV values) for each hue-region in which pixels have been sorted in S51 and the percentage of the sample image 21 that each hue-region occupies.

The representative values (HSV values) for each hue-region are defined as follows.

Representative values for the R hue-region: sHr, sSr, sVr
Representative values for the G hue-region: sHg, sSg, sVg
Representative values for the B hue-region: sHb, sSb, sVb
Representative values for the C hue-region; sHc, sSc, sVc
Representative values for the M hue-region: sHm, sSm, sVm
Representative values for the Y hue-region: sHy, sSy, sVy Here, the representative values in each hue-region are average values of the HSV values of all the pixels allocated in the subject hue-region. The representative values for each hue-region may be median values or middle values of the HSV values of all the pixels in the subject hue-region.

The percentage that each hue-region occupies in the sample image is defined as follows:
Percentage that the R hue-region occupies in the sample image: sRateR
Percentage that the G hue-region occupies in the sample image: sRateG
Percentage that the B hue-region occupies in the sample image: sRateB
Percentage that the C hue-region occupies in the sample image: sRateC
Percentage that the M hue-region occupies in the sample image: sRateM
Percentage that the Y hue-region occupies in the sample image: sRateY The percentage for the R hue-region, for example, may be defined as sRateR=(number of pixels in the R hue-region of the sample image)÷(total number of pixels in the sample image), or may be defined according to another equation.

Returning to FIG. 4, in S15 the CPU 9 performs a process to convert each pixel in the original image read in S11 to a set of HSV parameters. In S16 the CPU 9 performs a second characteristic quantity data determination process for determining a set of second characteristic quantity data denoting a characteristic of the original image based on the HSV parameters obtained in the conversion process of S15.

Figure 8:
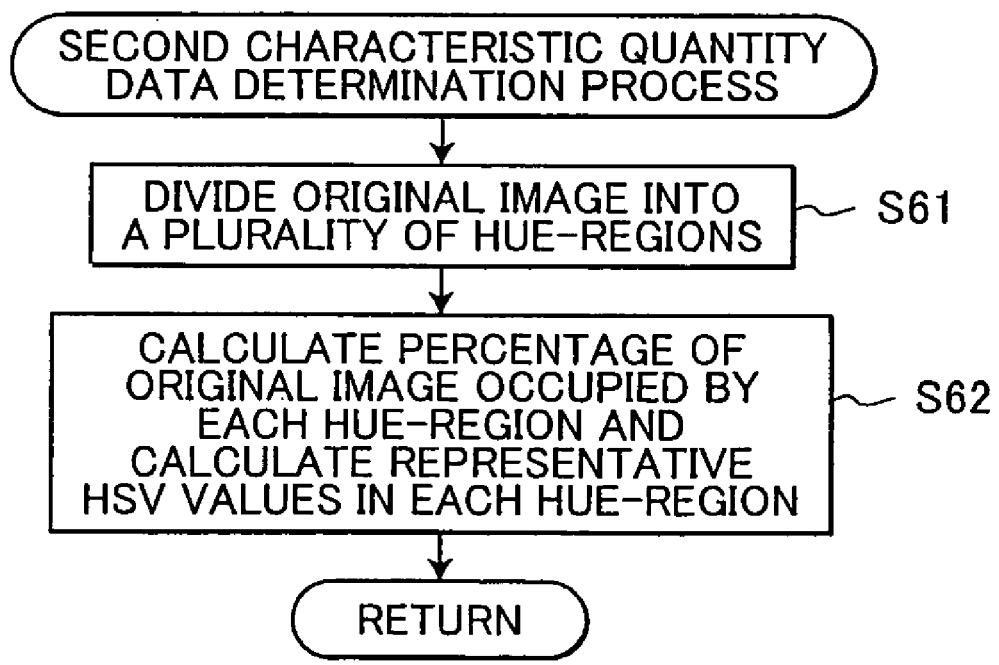
FIG. 8 is a flowchart illustrating steps in a second characteristic quantity data determination process.

Next, the second characteristic data determination process for extracting the second characteristic quantity data from the original image will be described with reference to FIG. 8. FIG. 8 is a flowchart illustrating steps in the second characteristic quantity data determination process. In S61 and S62, similarly to the pixels in the sample image, all the pixels in the original image are sorted in the six hue-regions R, G, B, C, H and Y in a manner the same as S51 and S52 of FIG. 7. It is noted that the second characteristic quantity data obtained for the original image in S16 of FIG. 4 includes the following data:
Representative values for the R hue-region: iHr, iSr, iVr
Representative values for the G hue-region: iHg, iSg, iVg
Representative values for the B hue-region: iHb, iSb, iVb
Representative values for the C hue-region: iHc, iSc, iVc
Representative values for the H hue-region: iHm, iSm, iVm
Representative values for the Y hue-region: iHy, iSy, iVy
Percentage that the R hue-region occupies in the original image: iRateR
Percentage that the G hue-region occupies in the original image: iRateG
Percentage that the B hue-region occupies in the original image: iRateB
Percentage that the C hue-region occupies in the original image: iRateC
Percentage that the M hue-region occupies in the original. image: iRateM
Percentage that the Y hue-region occupies in the original image: iRateY In S17 the CPU 9 corrects the original image based on the first characteristic quantity data determined in S14 and second characteristic quantity data determined in S16.

The process to convert the original image based on the first and second characteristic quantity data will be described in detail. In this process, the image processing device 1 converts the H value, S value, and V value of each pixel in the original image.

Figure 9:
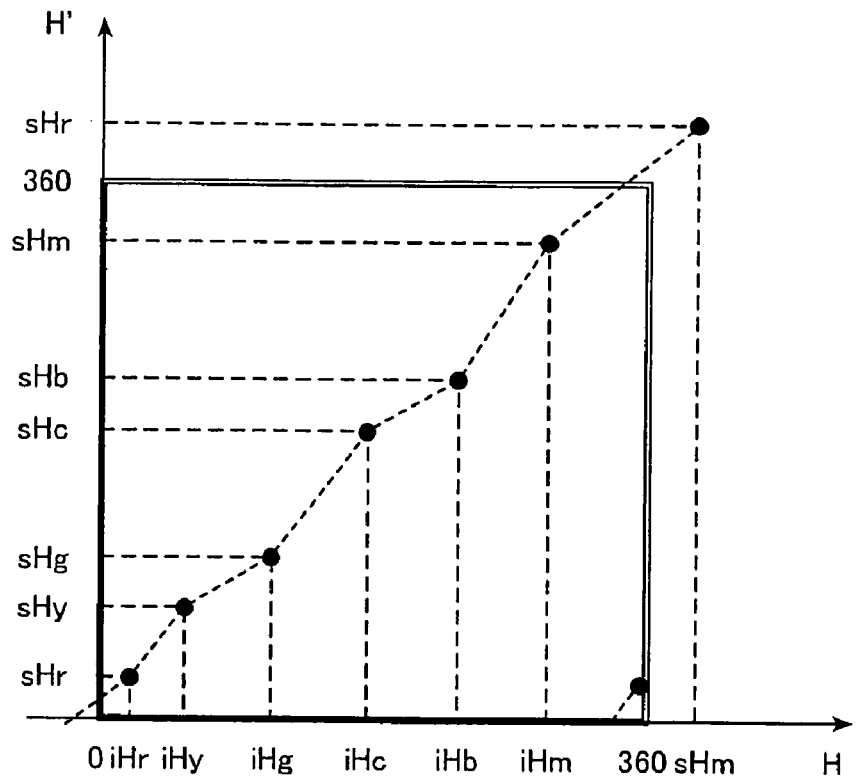
FIG. 9 is a graph for a hue correction table.

First, the conversion process for the H value of each pixel in the original image will be described. Representative H values for all the hue-regions are plotted in a graph, as shown in FIG. 9, with the X-axis denoting the representative H values of the original image and the Y-axis denoting the representative H values (denoted by H') of the first characteristic quantity data, Subsequently, a hue conversion table based on the graph in FIG. 9 is created as indicated by a broken line using linear interpolation, for example, between the plotted points.

The H value of each pixel in the original image is corrected into a corrected H' value by applying the hue conversion table to the H value in each pixel. More specifically, the corrected H' value is calculated according to the following equation:

$$H'=(y2-y1)\div(x2-x1)\times H-(y2-y1)\div(x2-x1)\times x2+y2 \qquad \text{(Equation 1)}$$

Here, H' is set to H'−360 when H'>360.
Here, x1, x2, y1, and y2 are defined as follows.
When H<iHr,
(x1,y1)=(iHm−360,sHm−360), and
(x2,y2)=(iHr,sHr).
When iHr≦H<iHy,
(x1,y1)=(iHr,sHr), and
(x2,y2)=(iHy,sHy).
When iHy≦H<iHg,
(x1,y1)=(iHy,sHy), and
(x2,y2)=(iHg,sHg).
When iHg≦H<iHc,
(x1,y1)=(iHg,sHg), and
(x2,y2)=(iHc,sHc).
When iHc≦H<iHb,
(x1, y1)=(iHc,sHc), and
(x2,y2)=(iHb,sHb).
When iHb≦H<iHm,
(x1,y1)=(iHb,sHb), and
(x2,y2)=(iHm,sHm).
When iHm≦H,
(x1,y1)=(iHm,sHm), and
(x2,y2)=(iHr+360,sHr+360).

Next, conversion of the S value and V value in each pixel will be described The S and V values of each pixel in the original image are converted in a manner that is determined dependent on the hue-region in which the hue value H of the subject pixel is allocated. For example, values "S'" and "V'" for a pixel, whose H value is allocated in the R hue-region, are converted into corrected values "S'" and "V'" by the following equations:
When S≦iSr, $$S'=S\times(sSr\div iSr) \qquad \text{(Equation 2)}.$$

When S>iSr, $$S'=1-(S-1)\times((1-sSr)\div(1-iSr)) \qquad \text{(Equation 3)}$$

When V≦iVr, $$V'=V\times(sVr\div iVr) \qquad \text{(Equation 4)}$$

When V>iVr, $$V'1+(V-1)\times((1-sVr)\div(1-iVr)) \qquad \text{(Equation 5)}.$$

S and V values for pixels, whose H values are allocated in other hue-regions, can be similarly calculated. Below, a conversion table defined by the above-described conversion method for S values is referred to as a saturation conversion table, while a conversion table defined by the above-described conversion method for the V value is referred to as a brightness conversion table.

Next, the HSV values of each pixel that has been converted as described above in connected to a format (RGB values, for example) suitable for the printer 10. The following method of conversion is merely an example, and it should be apparent that conversion may be performed according to another method.

Method of HSV→RGB Conversion

Below, in, fl, m, and n are parameters used in the process of calculating RGB values from HSV values. Here, in will be the integer portion of (H'+60) and fl the decimal portion of (H'+60)

When in is even, fl=1−fl.

$$m = V' \times (1 - S')$$

$$n = V' \times (1 - S' \times fl)$$

When in is 0, $$R = V' \times 255,$$

$$G = n \times 255, \text{ and}$$

$$B = m \times 255.$$

When in is 1, $$R = n \times 255,$$

$$G = V' \times 255, \text{ and}$$

$$B = m \times 255.$$

When in is 2, $$R = m \times 255,$$

$$G = V' \times 255, \text{ and}$$

$$B = n \times 255.$$

When in is 3, $$R = m \times 255,$$

$$G = n \times 255, \text{ and}$$

$$B = V' \times 255,$$

When in is 4, $$R = n \times 255,$$

$$G = m \times 255, \text{ and}$$

$$B = V' \times 255.$$

When in is 5, $$R = V' \times 255,$$

$$G = m \times 255, \text{ and}$$

$$B = n \times 255.$$

In S18 the CPU 9 controls the printer 10 to print the corrected original image, and then the CPU 9 ends the color correction process.

By performing the image correction process described above, the image processing device 1 can convert color tones in the original image to color tones of the sample image for each hue-region divided based on the H value Further, by dividing the original image and sample image into a plurality of hue-regions, the image processing device 1 having this construction can divide the image based on human-perceivable data and can perform very accurate color correction. Further, by performing different image correction processes on representative H values as hue-related characteristic quantity data and representative S and V values as non-hue-related characteristic quantity data, the image processing device can achieve the desired image correction process more easily.

Figure 11:
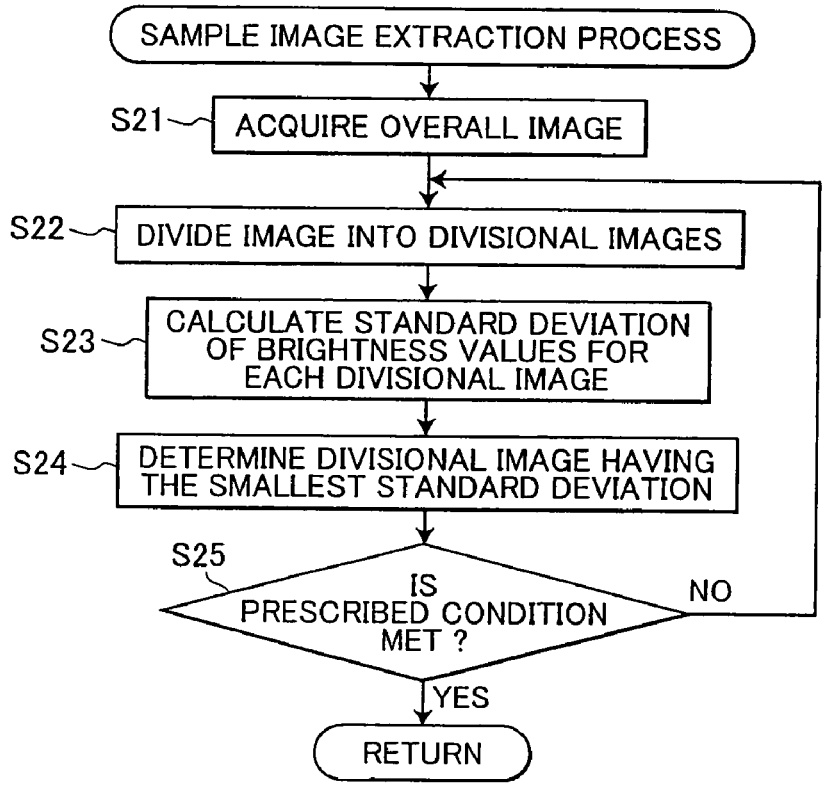
FIG. 11 is a flowchart illustrating steps in a sample image extraction process according to a second embodiment.

Next, a second embodiment of the present invention will be described while referring to the FIGS. 10A through 12B. The image processing device 1 according to the second embodiment differs from the image processing device 1 in the first embodiment described above in that a sample image extraction process illustrated by the flowchart in FIG. 11 is performed in place of the sample image extraction process of S12 described above with reference to FIG. 4. The remaining configuration of the image processing device 1 is identical to that in the first embodiment and will not be described here.

Figure 10A:
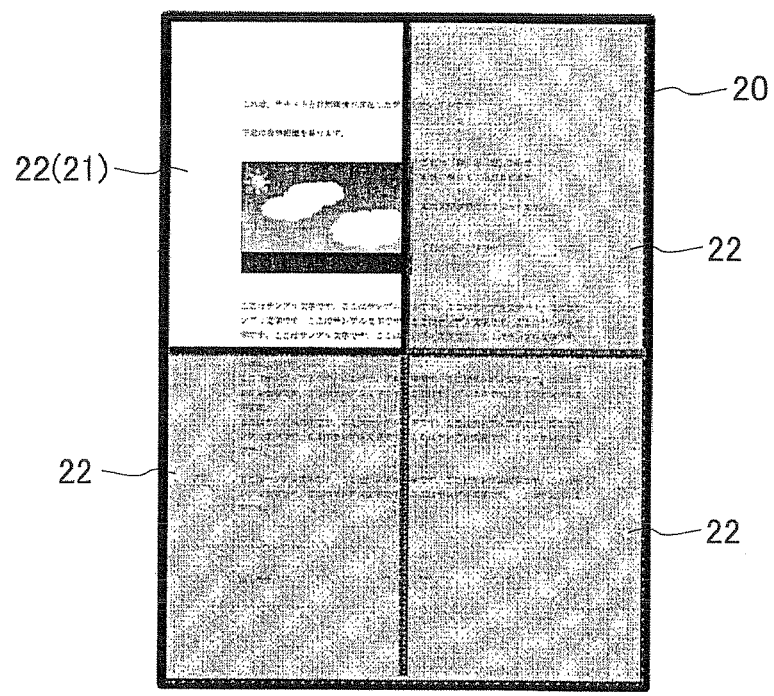
FIG. 10A is an explanatory diagram showing the overall image when the overall image has been divided.

Concept of the sample image extraction process according to the second embodiment will be described with reference in FIGS. 10A and 10B. As shown in FIG. 10A, the overall image 20 is divided into a plurality of divisional images 22. In the example of FIG. 10A, the overall image 20 is divided into four divisional images 22, but the overall image 20 may be divided into six or eight images, for example. Next, the CPU 9 extracts, as the sample image 21, one divisional image 22 that is considered to have the highest percentage of area including a photograph (the divisional image 22 in the upper left in FIG. 10A).

Figure 10B:
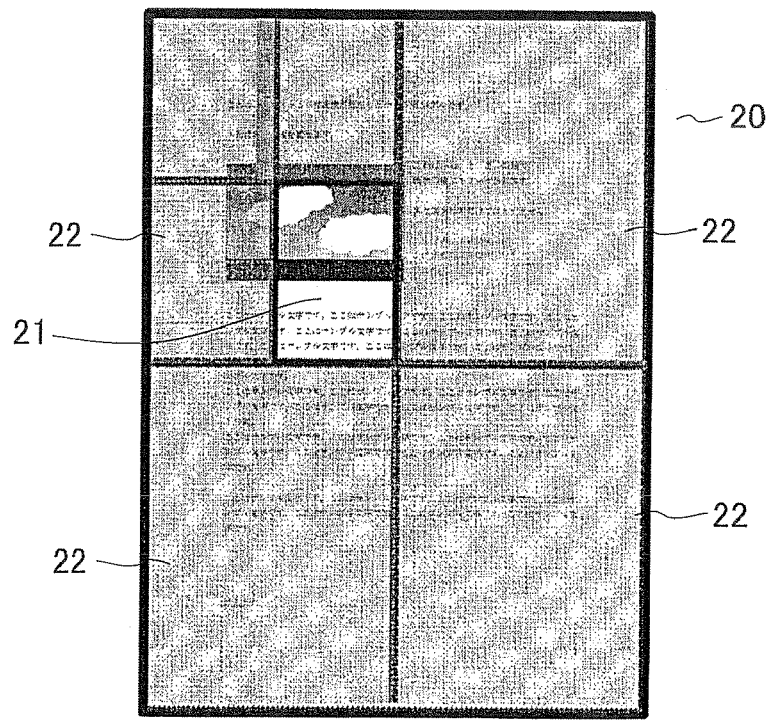
FIG. 10B is an explanatory diagram showing the divided overall image when the overall image shown in FIG. 10A is divided again.

The image processing device 1 may further divide, into a plurality of smaller divisional images, the divisional image that is considered to have the highest percentage of area including a photograph, as shown in FIG. 10B. Subsequently, the image processing device 1 extracts, as the sample image 21, the divisional image that is considered to have the highest percentage of area including a photograph among resultant divisional images. This division process may be repeated until the divisional image that is considered to have the highest percentage of area including a photograph meets a prescribed condition. This prescribed condition will be described later.

Next, the sample image extraction process according to the second embodiment will be described in greater detail with reference to FIG. 11. FIG. 11 is a flowchart illustrating steps in the sample image extraction process according to the second embodiment.

In S21 of FIG. 11, the CPU 9 of the image processing device 1 acquires the overall image 20 read in S11 of FIG. 4. In S22 the CPU 9 divides the acquired in a manner image as described above with reference to FIGS. 10A and 10B. Here, the image being divided is either the overall image 20 acquired in S21 or a divisional image that is determined in S24 to be described below.

In S23 the CPU 9 calculates a standard deviation of brightness values of pixels in each divisional image obtained in S22. Here, the CPU 9 may calculate a variance rather than the standard deviation.

In S24 the CPU 9 determines a divisional image having the smallest standard deviation among the plurality of divisional images. Since the colors in photographic images are generally distributed widely among the color regions, the standard deviation for photographic images is generally smaller than that in image with text area. Therefore, the determined image can be treated as a divisional image having the greatest percentage of area containing a photograph. For example, FIGS. 12A and 12B illustrate the relationship between the standard deviation of brightness values and images. FIG. 12A shows an image with a photograph area and an image with a text area together with their standard deviations for brightness values. From FIG. 12A, it is clear that the standard deviation of the image having a photograph area is smaller than that of the image with the text area. FIG. 12B is a histogram of brightness values in the photograph area and text area, where the horizontal axis represents the brightness value and the vertical axis frequency. Also, the bold line represents a histogram of the text area and the thin line a histogram of the photograph area. From FIG. 12B, it is clear that the brightness values are more widely distributed in the image with the photograph area.

In S25 of the process in FIG. 11, the CPU 9 determines whether a prescribed condition has been met. The prescribed condition is met when the standard deviation in the image determined in S24 is less than or equal to a prescribed value. The CPU 9 determines that the standard deviation of the determined image is greater than the prescribed value when area other than the photograph area (text area) occupies a large percentage in the determined image. In this case, the CPU 9 further divides the determined image into a plurality of images. The prescribed value is stored in a pre-assigned storage area (the RAM 7 in this embodiment) of the image processing device 1. The image processing device 1 may also be configured to accept direct input of the prescribed value from the user. Further, the prescribed condition may be met when the number of divisional images has reached a prescribed number.

If the prescribed condition is met (S25: YES), the CPU 9 ends the sample image extraction process. At this time, the divisional image determined in S24 is set as the sample image 21. However, if the prescribed condition is not met (525: NO), the CPU 9 returns to S22.

With the sample image extraction process according to the second embodiment, the image processing device 1 can perform extracting the sample image quickly, since there is no need to determine the photograph area in each pixel or in each small group of pixels precisely. Further, by determining the divisional image having the smallest standard deviation among the plurality of divisional images in S24, the image correction process is affected very little when an area other than the photograph area occupies a portion of the sample image or when a portion of the photograph area is missing from the sample image.

Further, the image processing device 1 according to the second embodiment, extracts the sample image 21 including a photograph area from the overall image 20. Therefore, the image processing device 1 can extract the sample image 21, even when the document read by the scanner 2 contains a combination of text and a photograph, for example Next, a third embodiment of the present invention will be described while referring to the FIG. 13. The image processing device 1 according to the third embodiment differs from the image processing device 1 in the first embodiment described above in that a sample image extraction process illustrated by the flowchart in FIG. 13 is performed in place of the sample image extraction process of S12 described above with reference to FIG. 4. The remaining configuration of the image processing device 1 is identical to that in the first embodiment and will not be described here.

FIG. 13 is a flowchart illustrating a sample image extraction process according to third embodiment. The process performed in S21-S23 of FIG. 13 is identical to that in S21-S23 of FIG. 11 (the second embodiment) and a description of this process will not be repeated.

In S35 the CPU 9 determines whether there exists a divisional image having a standard deviation less than or equal to the prescribed value. The prescribed value is the same as the prescribed value in S25 of FIG. 11 (the second embodiment). When the divisional image has a standard deviation less than or equal to the prescribed value, there is a high probability that this divisional image includes a large portion of photograph area. Therefore, the CPU 9 advances to S24 if there are no divisional image with a standard deviation less than or equal to the prescribed value (S35: NO). However, when there exists a region of the image with a standard deviation no greater than the prescribed amount (S35: YES), the CPU 9 advances to S36. Further, the CPU 9 may determine that the image read in S11 of FIG. 4 does not include a photograph area when a negative determination has been made in S35 a prescribed number of times (No in S35), and may be configured to end the sample image extraction process in this case.

In S24 the CPU 9 determines a divisional image that has the smallest standard deviation among standard deviations calculated for all the divisional images in S23. This process is identical to the process in S24 of FIG. 8. Below, the divisional image determined in S24 will also be referred to as a "first divisional image." The first divisional image has a high probability of including a photograph area. In order to try acquiring a divisional image having a greater percentage of the photograph area, the first divisional image is further divided into a prescribed number of smaller divisions (which will be referred to as "second divisional image") in S22 in S36 the CPU 9 determines whether there exists only one second divisional image having a standard deviation less than or equal to the prescribed value. If there exists only one such second divisional image (S36: YES), in S37 the CPU 9 determines the second divisional image as the sample image. However, if there is more than one second divisional image having a standard deviation less than or equal to the prescribed value (S36: NO), in S38 the CPU 9 sets the first divisional image that has been determined in S24 prior to the most recent division in S22 as the sample image. The following example assumes the case in which the first divisional image has been divided into a prescribed number of second divisional images with a plurality of these second divisional images having a standard deviation less than or equal to the prescribed value. In this case, the first divisional image is set as the sample image since the first divisional image has been the last divisional image determined in S24 prior to the last division. In other words, when there exist a plurality of divisional images containing a large photograph area, all of these divisional images become part of the sample image.

Figure 14:
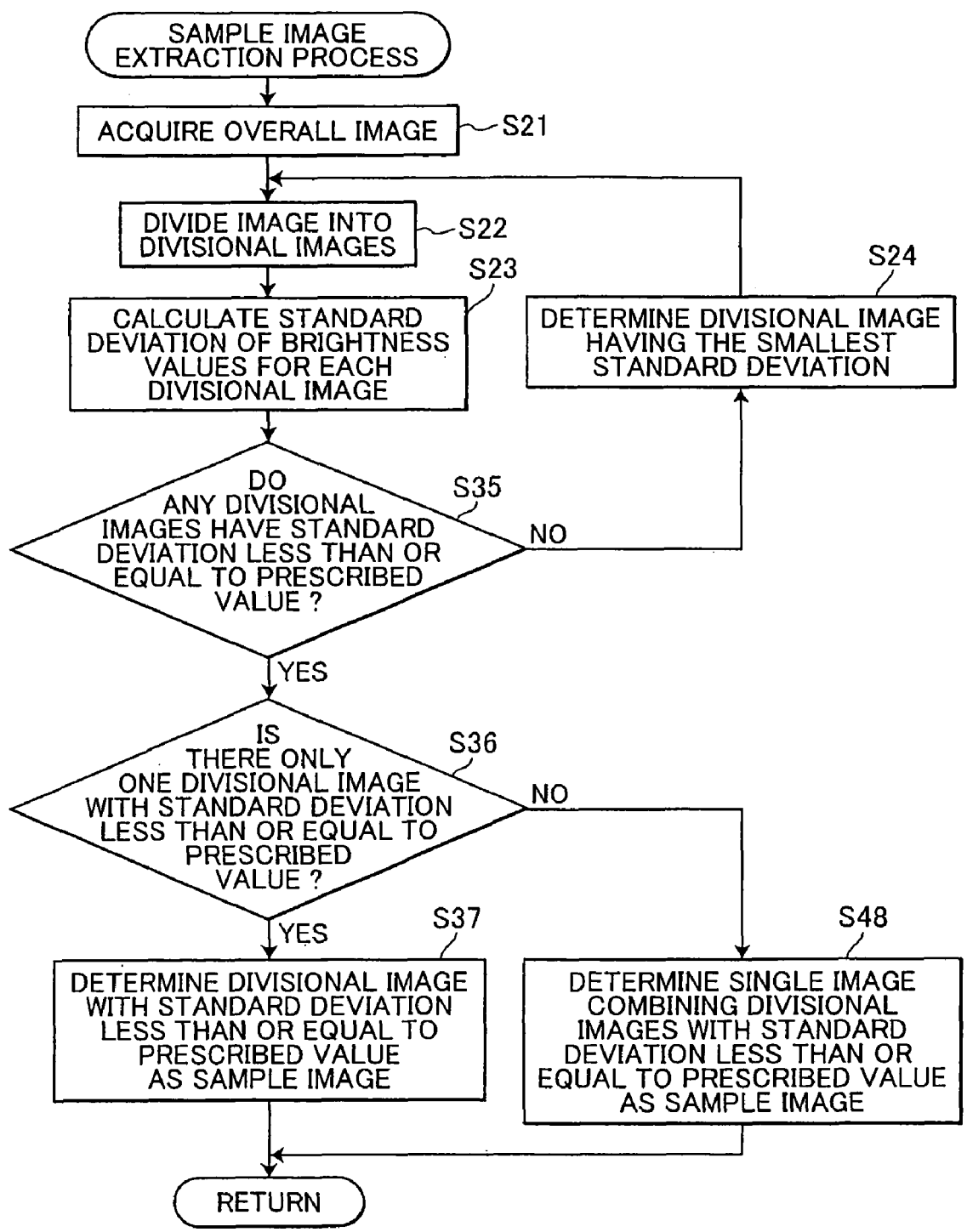
FIG. 14 is a flowchart illustrating steps in a sample image extraction process according to a fourth embodiment.

Next, a fourth embodiment of the present invention will be described while referring to the FIGS. 14 through 15B. The image processing device 1 according to the fourth embodiment differs from the image processing device 1 in the first embodiment described above in that a sample image extraction process illustrated by the flowchart in FIG. 14 is performed in place of the sample image extraction process of S12 described above with reference to FIG. 4. The remaining configuration of the image processing device 1 is identical to that in the first embodiment and will not be described here.

FIG. 14 is a flowchart illustrating the sample image extraction process according to the fourth embodiment. Since the sample image extraction process in FIG. 14 differs from the process in FIG. 13 only in S48, only this difference will be described below.

Specifically, when there exists a plurality of divisional images having a standard deviation less than or equal to the prescribed value, in S48 the CPU 9 combines, into the sample image, the divisional images that have been determined in S24 to have a standard deviation less than or equal to the prescribed value into a single image and sets this combined image. Since the first characteristic quantity data determined in S14 does not include information for consolidating pixels, an image obtained by combining partial pixels of the overall image 20 can be set as the sample image 21.

Figure 15A:
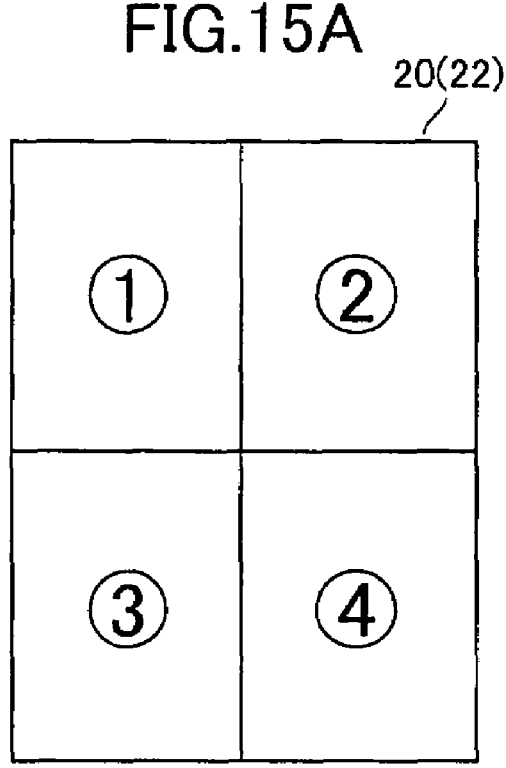
FIG. 15A is an explanatory diagram showing divisional images.
Figure 15B:
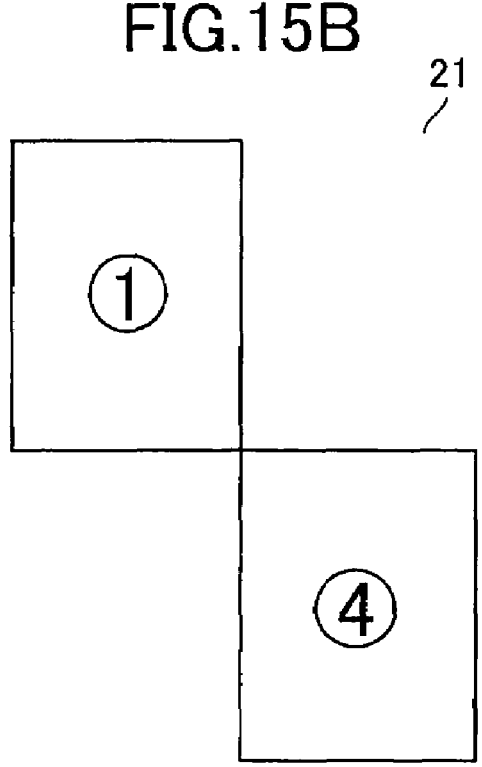
FIG. 15B is an explanatory diagram showing a sample image extracted from the divisional images shown in FIG. 15A.

The above point is illustrated in FIGS. 15A and 15B. As shown in FIG. 15A, the overall image 20 is divided to obtain divisional image 1-4. If divisional images 1 and 4 have standard deviations less than or equal to the prescribed value at this time, a combined image including the divisional images 1 and 4 shown in FIG. 12B is set as the sample image 21.

Next will be described an image processing device according to a fifth embodiment. This image processing device is capable of suspending part of the color correction process or controlling the amount of the image correction for each hue-region based on the size thereof. In this way, the user can control the process to reflect only some color tone of the sample image in the color tones of the original image.

Figure 16:
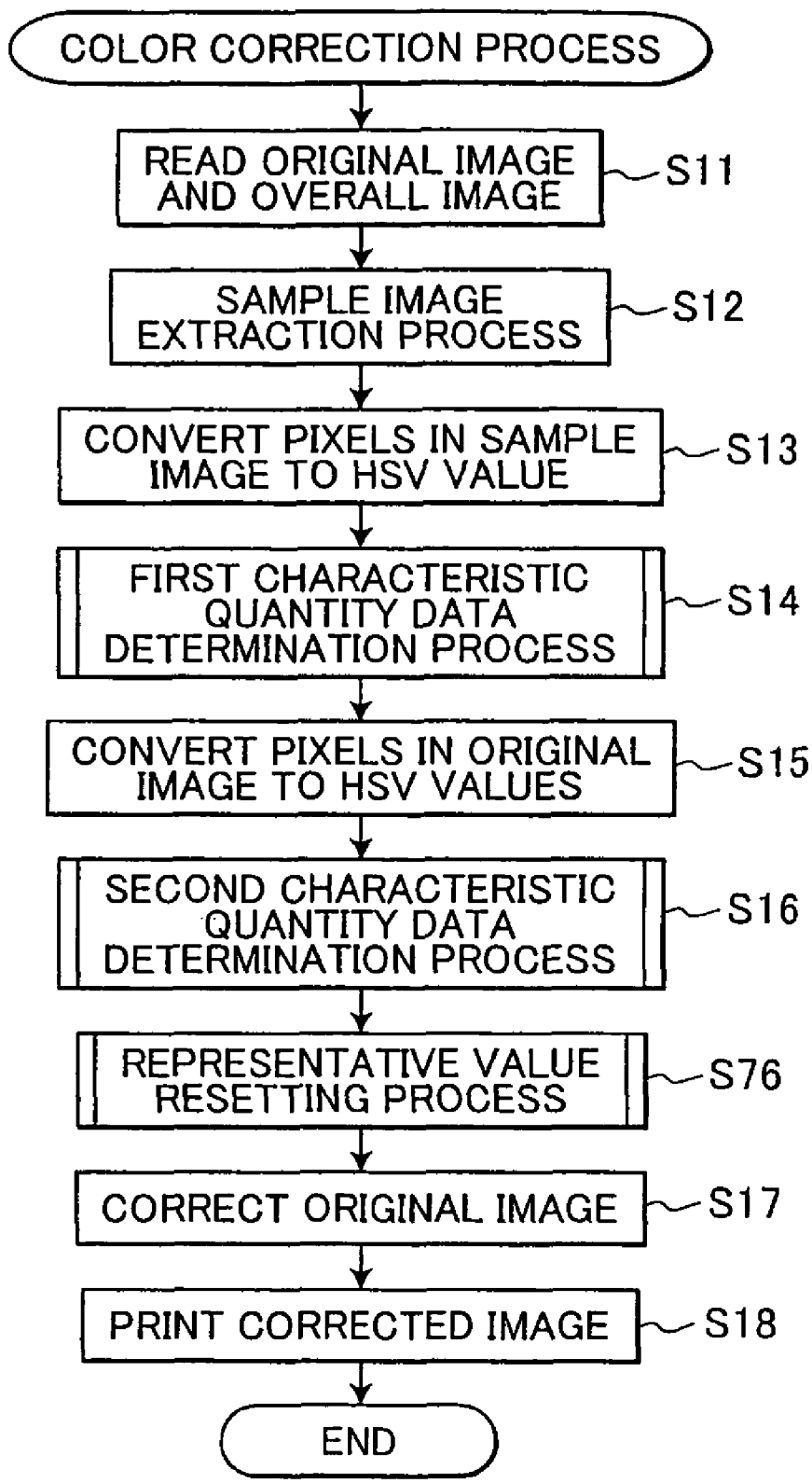
FIG. 16 is a flowchart illustrating steps in a color correction process according to a fifth embodiment.

FIG. 16 is a flowchart illustrating steps in a color correction process according to the fifth embodiment The process shown in FIG. 16 is basically the same as that in FIG. 4 described in the first embodiment, except that a representative value resetting process (S76) is added after the second characteristic quantity data determination process of S16.

Figure 17:
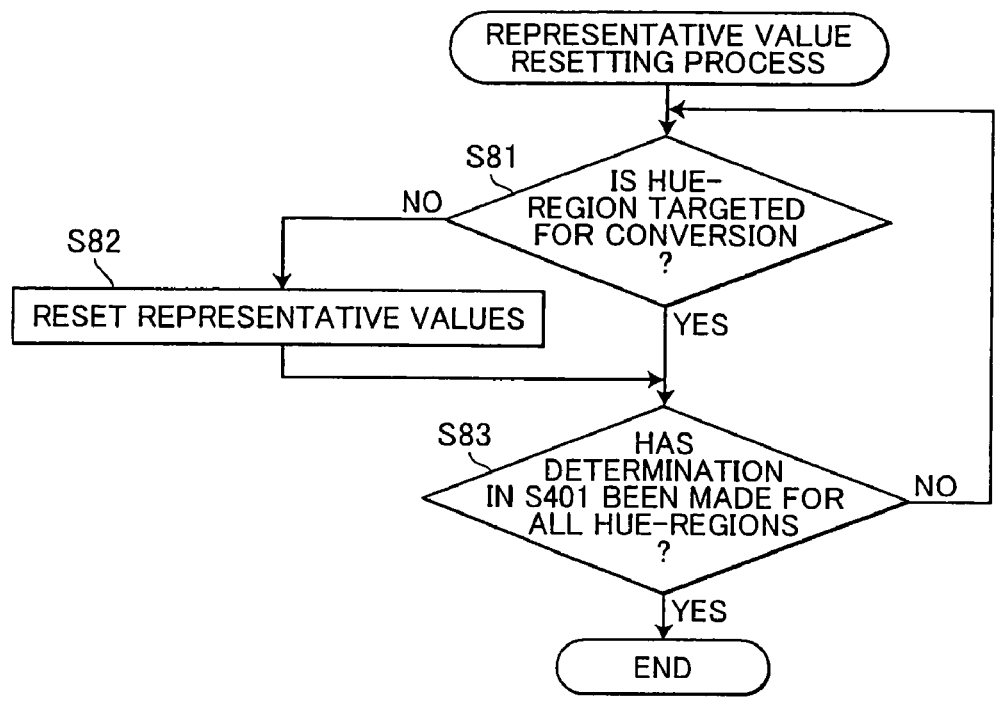
FIG. 17 is a flowchart illustrating steps in a representative value resetting process.

FIG. 17 is a flowchart illustrating steps in the representative value resetting process of S76 in FIG. 16. In S91 of this process, the CPU 9 determines whether one hue-region among the six hue-regions should be a target of conversion. The CPU 9 performs this determination by determining whether the subject hue-region meets a prescribed condition.

The CPU 9 advances to S82 when determining that the hue-region is not a target of conversion (S81: NO) and advances to S83 when determining that the hue-region is a target of conversion (S81: YES). In S82 the CPU 9 resets the representative values for the subject hue-region and subsequently advances to S83. More specifically, for the hue-region that is not a target of conversion, the CPU 9 resets the hue representative values in the first characteristic quantity data and in the second characteristic quantity data to be equal to each other, resets the saturation representative values in the first characteristic quantity data and in the second characteristic quantity data to be equal to each other, and resets the brightness representative values in the first characteristic quantity data arid in the second characteristic quantity data to be equal to each other. For example, the CPU 9 resets the hue representative values to the middle value of the subject hue region, resets the saturation representative values to the middle value (0.5) in the range of saturation (0 to 1), and resets the brightness representative values to the middle value (0.5) in the range of brightness (0 to 1).

In S83 the CPU 9 determines whether the process in S81 for determining whether a hue-region is to be converted has been performed for all hue-regions (six hue-regions in the example). If there remain any hue-regions for which the determination of S81 has not yet been performed (S83: NO), the CPU 9 returns to S81. When a determination has been performed on all hue-regions (S83: YES), the CPU 9 ends the representative value resetting process. Examples of the method of the judgment in S81 includes: (A) a method of using a threshold thre; and (B) a method of using data of a hue-region having the largest area.

(A) Method Using a Threshold Thre

The prescribed condition used in the judgment of S81 described above is a relationship between the size of the hue-region in question and a threshold Thre. When the percentage of the original image or sample image occupied by the subject hue-region is less than the threshold Thre (yes in S81), the CPU 9 changes in S82 the representative values in the first characteristic quantity data of the original image and the representative values in the second characteristic quantity data of the sample image related to this hue-region to the same values, so that conversion will be executed by using the new representative values The representative values can be changed or reset in the following way:

When sRateR<Thre or iRateR<Thre,
sHr=0, sSr=0.5, sVr=0.5,
iHr=0, iSr=0.5, iVr=0.5.
When sRateG<Thre or iRateG<Thre,
sHg=120, sSg=0.5, sVg=0.5,
iHg=120, iSg=0.5, iVg=0.5.
When sRateB<Thre or iRateB<Thre,
sHb=240, sSb=0.5, sVb=0.5,
iHb=240, iSb=0.5, iVb=0.5.
When sRateC<Thre or iRateC<Thre,
sHc=180, sSc=0.5, sVc=0.5,
iRc=180, iSc=0.5, iVc=0.5.
When aRateM<Thre or iRateM<Thre,
sHm=300, sSm=0.5, sVm=0.5,
iRm=300, iSm=0.5, iVm=0.5.
When sRateY<Thre or iRateY<Thre,
sHy=60, sSy=0.5, sVy=0.5,
iHy=60, iSy=0.5, iVy=0.5.

The above example employs the middle value 0.5 of possible values (0-1) for the S value and V value, and also employs the middle value of the corresponding hue-region for the H value. However, the representative values described above are merely an example, and the present invention is not limited to these values.

When converting a pixel using the equations described above (Equations 2-5), the S and V values of the pixel do not change using the representative values described above. For example, when $S \leq iSr$ for the R hue-region, S' is calculated according to equation 2 as follows.

$$S'=S \times (sSr+iSr)$$

However, since sSr=0.5 and iSr=0.5 in this equation, the equation becomes:

$$S'=S \times (0.5+0.5)=S \qquad \text{(Equation 6)}$$

Similarly, S'=S when S>iSr.

The V values in this hue-region are not changed, either. The S and V values in other hue-regions are also not changed in the same manner as described above for R hue-region.

Further, by resetting the representative values for some hue-region in a manner described above, it is possible to reduce the amount of conversion in the hue-region. In other words, the amount of conversion can be reduced by modifying the representative values, even when using the conversion equation described above (Equation 1).

Next, a method of determining the threshold Thre will be described. This value Thre can be set based on a sensory evaluation (visual impression). In sensory evaluations, the inventors have confirmed that any hue-region is likely to be perceived when the hue-region occupies more than about 6% of the entire image area. Hence, the threshold Thre can be set to 6%. However, the present invention is not limited to a threshold Thre of 6%.

It is also possible to set the threshold Thre to such a value that can extract hue-regions having a large area relative to other hue-regions. For example, because the image is divided into six hue-regions, the threshold Thre can be set to the inverse value, or ⅙ of the total number of the hue-regions.

The number "six" given as an example of the number of hue-regions is identical to a number that is obtained by subtracting the number of the achromatic colors white and black from the number of vertices (eight that is possessed by an RGB color spacer which is one of color gamuts expressing colors). The human eyes can differentiate colors sufficiently when the hues are divided into six hue-regions. If the number of the hue regions is set less than six, there is a possibility that the user may not feel that the original image is modified based on the sample image. Dividing the image into more than six hue-regions will increase the conversion accuracy. However, it is likely that the user will not be able to distinguish the differences in color. Further, the number of calculations increases when the number of divisions increases. When using a printer, such an increase in computations increases the time required to obtain the calibrated image as the printing results, potentially leading to more frustration for the user. Therefore, it is considered that six is a preferable number of divisions.

While the same threshold is used for all hue-regions in the above example, a different threshold Thre may be used for each hue-region.

(B) Method Using Data of a Hue-Region Having the Largest Area

In the above method (A), a threshold Thre is set and representative values are modified based on this threshold Thre, thereby performing control to suspend the image correction process in some hue-regions and to reduce the amount of conversions. Contrarily, the method (B) enables the image correction process to use data of a hue-region having the largest area in the image in order to incorporate only specific colors of the sample image in the original image.

In this method, the prescribed condition in the determination of S81 in FIG. 9 is whether a hue-region having the largest area in the original image is the same as a hue region having the largest area in the sample image, and the hue-region in question is the hue-region having the largest area both in the original image and in the sample image. If the judgment is S81 is affirmative, the representative values for hue-regions other than the subject hue-region are reset according to the following equations, where iMaxRate is the percentage of the original image occupied by the largest-area hue-region in the original image, and sMaxRate is the percentage of the sample image occupied by the largest-area hue-region in the sample image.

When sRateR≠sMaxRate or iRateR≠iMaxRate,
sHr=0, sS=0.5, sV=0.5,
iHr=0, iSr=0.5, iVr=0.5.
When sRateG≠sMaxRate or iRateG≠iMaxRate,
sHg=120, sSg=0.5, sVg=0.5,
iHg=120, iSg=0.5, iVg=0.5.
When sRateB≠sMaxRate or iRateB≠iMaxRate,
sHb=240, sSb=0.5, sVb=0.5,
iHb=240, iSb=0.5, iVb=0.5.
When sRateC≠sMaxRate or iRateC≠iMaxRate,
sHc=180, sSc=0.5, sVc=0.5,
iHc=180, iSc=0.5, iVc=0.5.
When sRateM≠sMaxRate or iRateM≠iMaxRate,
sHm=300, sSm=0.5, sVm=0.5,
iHm=300, iSm=0.5, iVm=0.5.
When sRateY≠sMaxRate or iRateY≠iMaxRate,
sHy=60, sSy=0.5, sVy=0.5,
iHy=60, iSy=0.5, iVy=0.5.

Through this process, only those pixels that are located in the hue-region that has the largest area both in the original image and in the sample image are converted. Accordingly, in the hue-regions other than the largest-area hue-region, S and V values are not converted, and the amount of conversions for H values is reduced.

Figure 18:
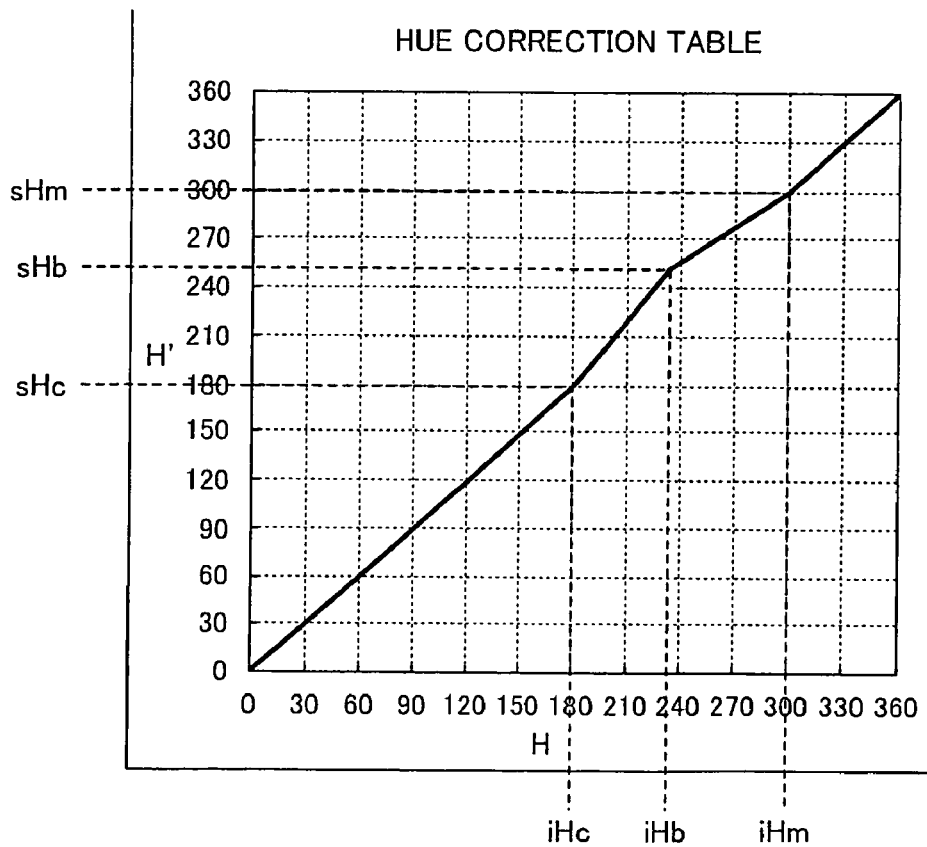
FIG. 18 is a graph for a hue correction table created when only the B hue-region is converted.

For example, when the B hue-region occupies the largest area both in the original image and the sample image, the hue correction table of FIG. 9 is modified into a hue correction table, such as shown in the graph of FIG. 18. As shown in the graph of FIG. 18, the representative H values (iHc=180, sHc=180) in the C hue-region adjacent to the B hue-region in the color space and the representative H values (iHb, sHb) in the B hue-region are connected with each other by a straight line, and the representative H values (iHm=300, sHm=300) in the M hue-region adjacent to the B hue-region in the color space and the representative H values (iHb, sHb) in the B hue-region are connected with each other by another straight line.

Therefore, H values are converted in both the C hue-region, where 180<H≦210, and the M hue-region, where 270<H≦300. The amount of conversion increases in values closer to the B hue-region.

In the image correction process according to the modification described above, it is possible to select hue-regions where conversion is executed. Further, since a portion of the H values in hue-regions not targeted for conversion but adjacent to hue-regions targeted for conversion in the color space are converted, this method can prevent the occurrence of false contour (tone jump) between converted and non-converted hue-regions.

By performing this representative value resetting process, the image processing device 1 can partially suspend the correction process for divided hue-regions based on the size of the hue-regions and can reduce the amount of conversions. Accordingly, the user is able to reflect only part of the color tones from the sample image in the color tones of the original image.

In the fifth embodiment described above, the representative value resetting process is performed to suspend part of the correction process based on the size of hue-regions and to reduce the amount of conversions. However, it is not necessary to perform the representative value resetting process.

In the fifth embodiment described above, a color correction process is used as an example of the image correction process, but an image correction process other than that described in the embodiment may be performed.

While the amount of conversion for H values in the hue-regions not targeted for conversion can be reduced in the image correction process of the fifth embodiment, the conversion may not be completely eliminated. This is because the H values in hue-regions not targeted for conversion are affected by the representative values in hue-regions targeted for conversion, since linear interpolation is performed using representative values of hue-regions not targeted for conversion, as illustrated in FIG. 18.

Figure 19:
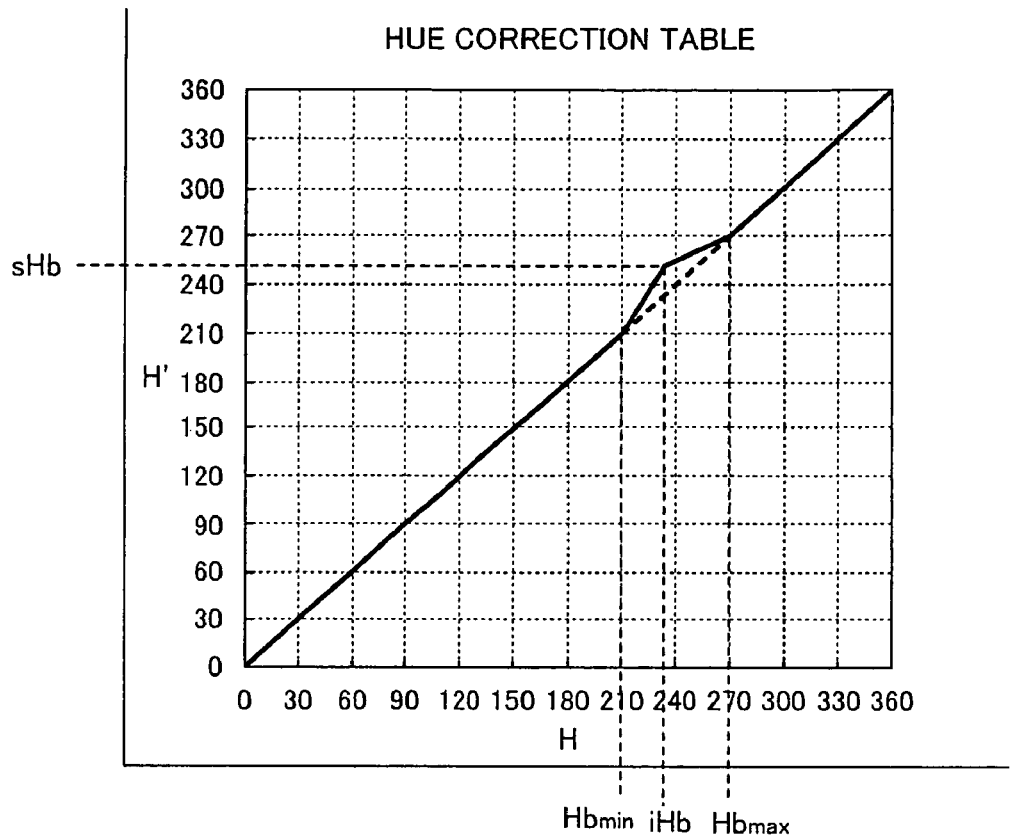
FIG. 19 is a graph for a hue correction table according to a modification of the fifth embodiment.

According to this modification, the hue correction table of FIG. 18 is further modified as shown in the graph in FIG. 19. FIG. 19 shows the hue correction table targeting only the B hue-region for conversion. While only one hue-region is targeted for conversion in FIG. 19, it is also possible to target a plurality of hue-regions.

In FIG. 19, H'=H for values outside the B hue-region, and thus image correction is not performed in these hue-regions. The value of H' in the B hue-region can be found with the following equation, where $Hb_{min}$ is the smallest value of H (210) in the B hue-region and $Hb_{max}$ is the largest value in the B hue-region (270).

When H<iHb, $$H'=Hb\mathrm{min}+(sHb-Hb\mathrm{min})\times(H-Hb\mathrm{min})\div(iHb-Hb\mathrm{min}).$$

When H>iHb, $$H'=sHb+(Hb\mathrm{max}-sHb)\times(H-iHb)\div(Hb\mathrm{max}-iHb).$$

Hence, the above equations can be used to convert pixels in only the targeted hue-region. By converting H values only in the hue-region targeted for conversion, the effects of image correction can be enhanced.

Figure 20:
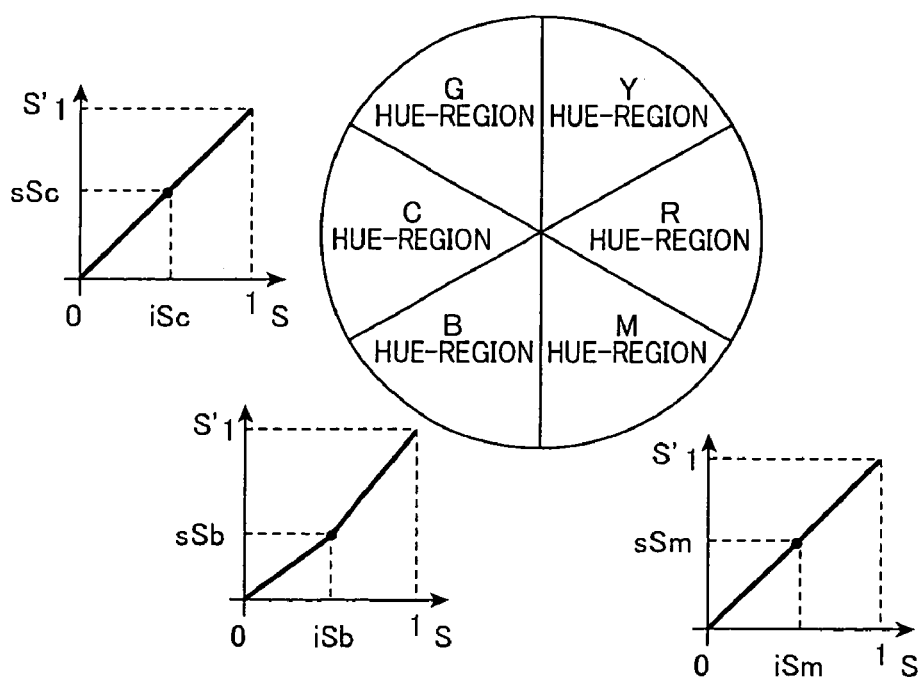
FIG. 20 shows graphs for three color hue-regions illustrating saturation correction tables.

In the above described embodiments, the S value correction curves for the respective hue-regions (conversion equation 2 or 3) are independent from one another. So, there is a danger of generating false contour (tone jump). More specifically, a table indicating the relationship between S and S' is provided for each hue-region, as shown in FIG. 20, without consideration for the properties of tables for adjacent hue-regions. Similarly, the V value correction curves (conversion equation 4 or 5) for the respective hue-regions are also independent from one another.

Figure 21:
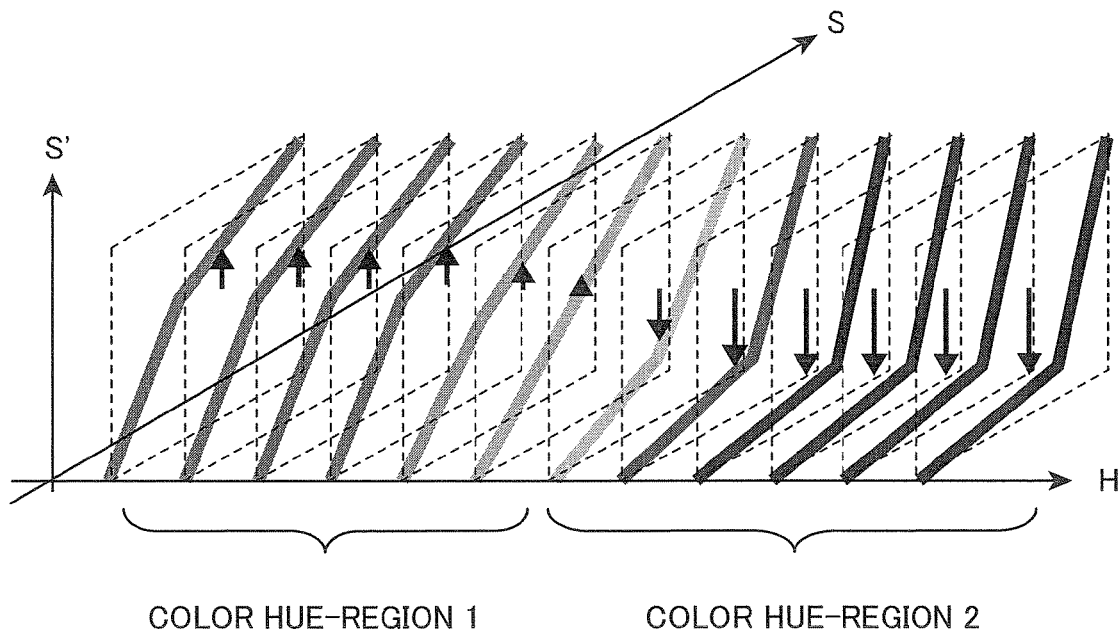
FIG. 21 is an explanatory diagram illustrating changes in a saturation correction, curve according to a modification.

In this modification, tone jump can be prevented by modifying the correction curves in the respective hue-regions so that the correction curves will smoothly change through the hue-regions as shown in FIG. 21.

According to the modification, the image correction process for correcting the hue value and the S value of a pixel is executed in S17 while modifying the correction curves. This image correction process will be described next in detail with reference to FIGS. 22 and 23. Following explanation is for the case where the hue value of a pixel targeted for conversion falls in the B hue-region and is nearer to the C hue-region than to the M hue-region. However, the process is essentially the same for other cases The value S of the pixel targeted for conversion is converted into a modified, converted value S" according to equation 7 below using the following parameters.

Figure 22:
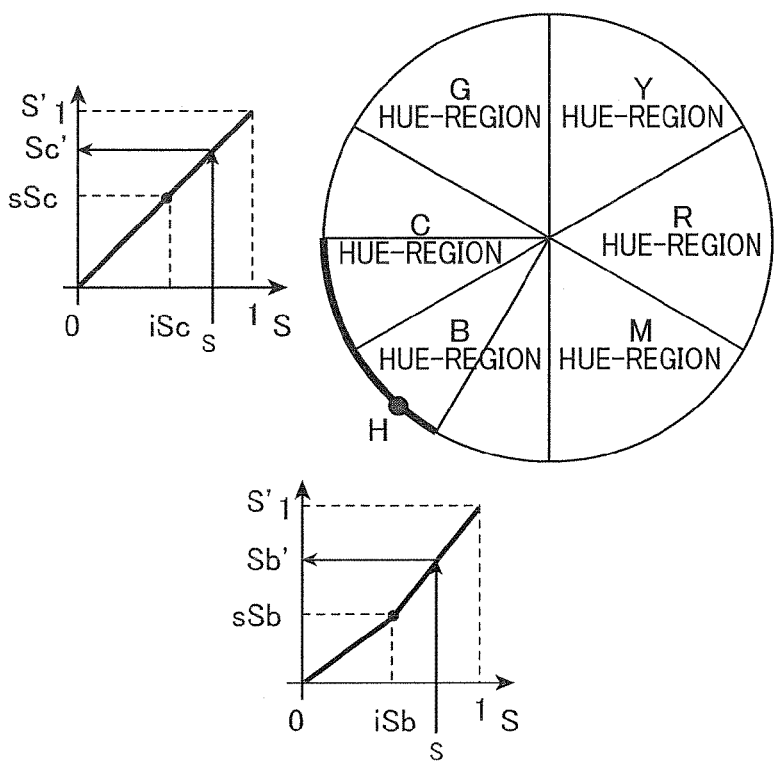
FIG. 22 shows graphs for saturation correction tables in the B hue-region and C hue-region according to the modification.
Figure 23:
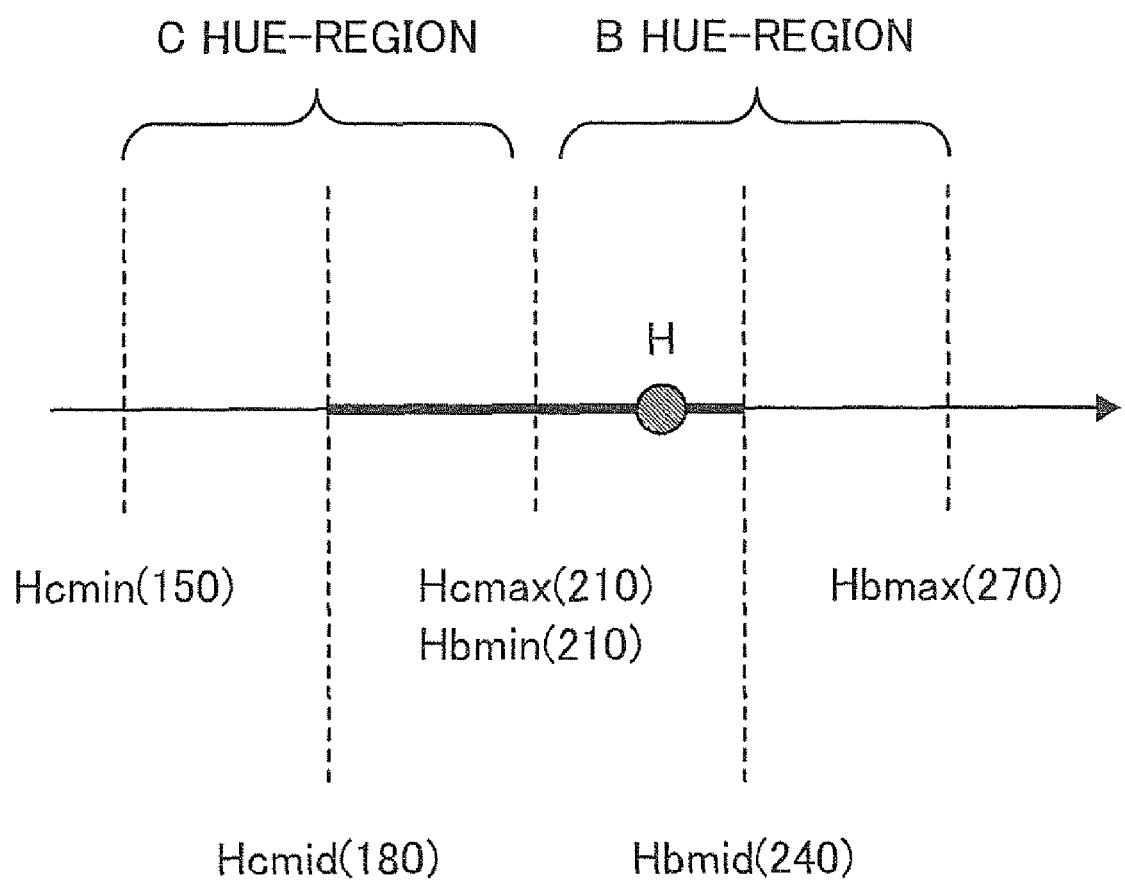
FIG. 23 is an explanatory diagram showing parts of the B hue-region and C hue-region targeted for conversion according to the modification.

H: The hue value for the pixel (see FIGS. 22 and 23)
S: The saturation value for the pixel (see FIG. 22)
$Hb_{mid}$: The middle hue value (240) in a target hue-region (B hue-region in this example), where the hue value H of the pixel falls
$Hc_{mid}$: The middle hue value (180) in another hue-region (C hue-region, in this example) that is adjacent to the target hue-region on a side near the hue coordinate position of the hue value H of the pixel (see FIGS. 22 and 23)
Sb': A B-region-dependent converted saturation value for the pixel, which is calculated by using the above-described equation 2 or 3 (the saturation correction table) for the B hue-region based on the saturation value S of the pixel as shown in FIG. 22 (see FIG. 22)
Sc': A C-region-dependent converted saturation value for the pixel, which is calculated by using the above-described equation 2 or 3 (the saturation correction table) for the C hue-region based on the saturation value S of the pixel as shown in FIG. 22 (see FIG. 22)

$$S''=((H-Hc_{mid})\times Sb'+(Hb_{mid}-H)\times Sc')\div((Hb_{mid}-Hc_{mid})) \quad \text{(Equation 7)}$$

The value V of the pixel targeted for conversion is converted into a modified, converted value V" according to equation 8 below using the following parameters.

H: The hue value for the pixel (see FIGS. 22 and 23)
V: The brightness value for the pixel
$Hb_{mid}$: The middle hue value (240) in a target hue-region (B hue-region in this example), where the hue value H of the pixel falls
$Hc_{mid}$: The middle hue value (180) in another hue-region (C hue-region, in this example) that is adjacent to the target hue-region on a side near the hue coordinate position of the hue value H of the pixel (see FIGS. 22 and 23)
Vb': A B-region-dependent converted brightness value for the pixel, which is calculated by using the above-described equation 4 or 5 (the brightness correction table) for the B hue-region based on the brightness value V of the pixel
Vc': A C-region-dependent converted brightness value for the pixel, which is calculated by using the above-described equation 4 or 5 (the brightness correction table) for the C hue-region based on the brightness value V of the pixel $$V''=((H-Hc_{mid})\times Vb'+(Hb_{mid}-H)\times Vc')\div((Hb_{mid}-Hc_{mid})) \quad \text{(Equation 8)}$$

The above process is performed when the hue value H of the pixel in question is in the range of $Hc_{mid}$ (180) to $Hb_{mid}$ (240) as shown in FIGS. 13 and 14. By finding the output saturation value (S") and lightness value (V") through the above calculations weighted according to the input hue value H, it is possible to produce smooth correction effects between hues.

The image processing device of the present embodiment may be modified to suitably combine the image correction processes described above. For example, it is possible to perform a process that emphasizes image correction for H values while preventing tone jump in S and V values.

As described above, the image processing device 1 of the above-described embodiments extracts only an area of an acquired image intended for use as a sample image (photograph areas) and uses this area as a model for image correction, making it possible to perform the image correction process more quickly. Further, since only the necessary hue-region is set as the target for image correction, it is possible to prevent errors in the image correction process. Further, by using a simple process to extract the photograph area, it is possible to perform the image correction process more quickly. Further, since this image correction process gives an image inputted from a storage medium the characteristics of an image read by the scanner 2, the user can execute image correction that is intuitive and requires only simple operations to perform.

With the image processing device 1 according to the embodiments, the user can execute color conversion on an original image that is intuitively based on a sample image and requires only sample operations to perform. For example, if the original image includes a building and sky and the user wishes to convert the blue color of the sky to a brilliant ocean blue, the image processing device 1 can perform this conversion based on a sample image of a brilliant ocean.

Similarly, if the original image shows a person's face and the user wishes to lighten the flesh tones, the image processing device 1 can convert flesh tones in the original image to lighter flesh tones based on a sample image showing these lighter flesh tones.

Hence, the user can perform desired color conversion simply by scanning a sample image with the scanner 2, and need not have any special knowledge of image processing. Further, since the image processing device 1 can automatically select hue-regions of an image to be subjected to correction, the image processing device 1 can convert colors in only hue-regions that are easily perceived, while reducing or eliminating the conversion of less noticeable hue-regions.

While the invention has been described in detail with reference to the embodiment thereof, it would be apparent to those skilled in the art that various changes and modifications may be made therein without departing from the spirit of the invention.

In the above-described embodiments, the image processing device 1 scans a sample image with the scanner 2, but the present invention is not limited to this configuration. For example, instead of scanning a sample image with the scanner 2, the image processing device 1 can read an image from a storage medium as the sample image. Further, the image processing device 1 can scan an original image using the scanner rather than reading the original image from a storage medium. Further, while the embodiments describe a multifunction device having a scanner and printer as the image processor, a data processor such as a personal computer may be used to perform image correction and to direct a printer connected to the data processor to perform a printing process.

Further, the process shown in the flowcharts described above is merely an example, and another process may be implemented based on another flowchart, provided that the process obtains similar effects to the process described in the embodiments.

Further, while the image processing device described above is a multifunction device, the image processing device may be a computer.

Further, the present invention is not limited to printing a corrected original image, but may also store the corrected original images in a storage medium or transfer the corrected original images to another device.

What is claimed is:

1. An image processing device comprising:
   a first image inputting unit that inputs a first image;
   a second image inputting unit that inputs a second image different from and not included in the first image;
   a first partial image extracting unit that extracts a desired region of the first image as a first partial image;
   a first characteristic quantity data determining unit that determines first characteristic quantity data based on the first partial image;
   a second characteristic quantity data determining unit that determines second characteristic quantity data based on the second image; and
   a correcting unit that corrects the second image based on the first characteristic quantity data and the second characteristic quantity data, and that corrects the second characteristic quantity data close to the first characteristic quantity data to make a color tone of the second image become close to a color tone of the first image, wherein the first image inputting unit inputs the first image optically read from a document placed on a prescribed reading position.

2. The image processing device according to claim 1, wherein the first image inputting unit inputs a first image including a photograph area, and
   wherein the first partial image extracting unit extracts, as the first partial image, an area including at least a part of the photograph area from the first image.

3. The image processing device according to claim 1, wherein the first partial image extracting unit comprises:
   a dividing unit that divides the first image into a plurality of divisional images;
   a calculating unit that calculates a distribution of brightness values in each of the divisional images; and
   an extracting unit that extracts the first partial image based on the distribution of brightness values in each of the divisional images.

4. The image processing device according to claim 3, wherein the calculating unit calculates variance or standard deviation of brightness values for each of the divisional images, and
   wherein the extracting unit extracts, from among all the divisional images, a divisional image having the smallest variance or standard deviation as the first partial image.

5. The image processing device according to claim 1, further comprises a first image dividing unit that divides the first image into a plurality of divisional images;
   a calculating unit that performs a calculation operation to calculate the variance or standard deviation of brightness values for each of the divisional images;
   a selecting unit that selects a divisional image having the smallest calculated variance or standard deviation among the plurality of divisional images;
   a dividing unit that performs a dividing operation to divide the divisional image having the smallest calculated variance or standard deviation; and
   a control unit that controls the dividing unit to perform the dividing operation to divide the first image into a plurality of divisional images, and the calculating unit to perform the calculation operation to calculate the variance or standard deviation of brightness value, and
      wherein the control unit controls the dividing unit, the calculating unit, and the selecting unit to repeat the dividing operation, calculating operation, and selecting operation when the variance or standard deviation for the divisional image having the smallest calculated variance or standard deviation is greater than the prescribed value.

6. The image processing device according to claim 5, wherein the first partial image extracting unit further comprises an extracting unit that extracts a divisional image having the smallest calculated variance or standard deviation as the first partial image when the variance or standard deviation for the divisional image having the smallest calculated variance or standard deviation is less than or equal to a prescribed value.

7. The image processing device according to claim 5, wherein the first partial image extracting unit further comprises an extracting unit extracting the first partial image in such a manner that when there is only one divisional image having variance or standard deviation less than or equal to the prescribed value, the extracting unit extracts the one divisional image as the first partial image, and when there is a plurality of divisional images having variances or standard deviations less than or equal to the prescribed value, the extracting unit extracts a preceding image which has been divided into the divisional images as the first partial image.

8. The image processing device according to claim 1, further comprising a correction data creating unit that creates correction data based on the first characteristic quantity data and the second characteristic quantity data, and
   wherein the image correcting unit corrects the second image based on the correction data.

9. The image processing device according to claim 1, wherein the first characteristic quantity data determining unit comprises:
   a first dividing unit that divides a plurality of pixels constituting the first image into a plurality of hue-regions;
   a first hue data determining unit that determines first hue-related data for each hue-region of the first image based on data of the first partial image; and
   a first non-hue data determining unit that determines first non-hue-related data for each hue-region of the first image based on data of the first partial image,
   wherein the second characteristic quantity data determining unit comprises:
   a second dividing unit that divides a plurality of pixels constituting the second image into a plurality of hue-regions based on data of the second image;
   a second hue data determining unit that determines second hue-related data for each hue-region of the second image based on data of the second image; and
   a second non-hue data determining unit that determines second non-hue-related data for each hue-region of the second image, wherein the correction data creating unit creates hue correction data based on the first hue data and second hue data, wherein the image correcting unit creates a plurality of non-hue correction data corresponding to the plurality of hue-regions, and wherein the correcting unit corrects hue-related data in each pixel of the second image based on the hue correction data, and corrects the non-hue-related data in each pixel of the second image based on the non-hue correction data of each hue-region.

10. The image processing device according to claim 9, wherein the first hue-related data is calculated based on H values of the pixels in the first partial image defined in the HSV color space, and wherein the second hue-related data is calculated based on H values of the pixels in the second image defined in the HSV color space.

11. The image processing device according to claim 1, wherein the second image inputting unit inputs the second image stored in a storage medium.

12. The image processing device according to claim 1, further comprising a printing unit that prints the corrected second image.

13. An image processing method comprising:
inputting a first image;
inputting a second image different from and not included in the first image;
extracting a desired region of the first image as a first partial image;
determining first characteristic quantity data based on the first partial image;
determining second characteristic quantity data based on the second image; and
correcting the second image based on the first characteristic quantity data and the second characteristic quantity data, and correcting the second characteristic quantity data close to the first characteristic quantity data to make a color tone of the second image become close to a color tone of the first image, wherein the first image inputting unit inputs the first image optically read from a document placed on a prescribed reading position.

14. A non-transitory computer-readable recording medium that stores an image data processing program, the data processing program comprising instructions for:
inputting a first image;
inputting a second image different from and not included in the first image;
extracting a desired region of the first image as a first partial image;
determining first characteristic quantity data based on the first partial image;
determining second characteristic quantity data based on the second image; and
correcting the second image based on the first characteristic quantity data and the second characteristic quantity data, and correcting the second characteristic quantity data close to the first characteristic quantity data to make a color tone of the second image become close to a color tone of the first image, wherein the first image inputting unit inputs the first image optically read from a document placed on a prescribed reading position.

15. An image processing device comprising:
a first image inputting unit that inputs a first image;
a second image inputting unit that inputs a second image different from and not included in the first image;
a first partial image extracting unit that extracts a desired region of the first image as a first partial image;
a first characteristic quantity data determining unit that determines first characteristic quantity data based on the first partial image;
a second characteristic quantity data determining unit that determines second characteristic quantity data based on the second image;
a correcting unit that corrects the second image based on the first characteristic quantity data and the second characteristic quantity data; and
a first image dividing unit that divides the first image into a plurality of divisional images;
a calculating unit that performs a calculation operation to calculate the variance or standard deviation of brightness values for each of the divisional images;
a selecting unit that selects a divisional image having the smallest calculated variance or standard deviation among the plurality of divisional images;
a dividing unit that performs a dividing operation to divide the divisional image having the smallest calculated variance or standard deviation; and
a control unit that controls the dividing unit to perform the dividing operation to divide the first image into a plurality of divisional images, and the calculating unit to perform the calculation operation to calculate the variance or standard deviation of brightness value, wherein the control unit controls the dividing unit, the calculating unit, and the selecting unit to repeat the dividing operation, calculating operation, and selecting operation when the variance or standard deviation for the divisional image having the smallest calculated variance or standard deviation is greater than the prescribed value.

16. An image processing device comprising:
a first image inputting unit that inputs a first image;
a second image inputting unit that inputs a second image different from and not included in the first image;
a first partial image extracting unit that extracts a desired region of the first image as a first partial image;
a first characteristic quantity data determining unit that determines first characteristic quantity data based on the first partial image, the first characteristic quantity data determining unit comprising:
a first dividing unit that divides a plurality of pixels constituting the first image into a plurality of hue-regions;
a first hue data determining unit that determines first hue-related data for each hue-region of the first image based on data of the first partial image; and
a first non-hue data determining unit that determines first non-hue-related data for each hue-region of the first image based on data of the first partial image;
a second characteristic quantity data determining unit that determines second characteristic quantity data based on the second image, the second characteristic quantity data determining unit comprising:
a second dividing unit that divides a plurality of pixels constituting the second image into a plurality of hue-regions based on data of the second image;
a second hue data determining unit that determines second hue-related data for each hue-region of the second image based on data of the second image; and
a second non-hue data determining unit that determines second non-hue-related data for each hue-region of the second image; and
a correcting unit that corrects the second image based on the first characteristic quantity data and the second characteristic quantity data, the correction data creating unit creating hue correction data based on the first hue data and second hue data, wherein the image correcting unit creates a plurality of non-hue correction data corresponding to the plurality of hue-regions, and wherein the correcting unit corrects hue-related data in each pixel of the second image based on the hue correction data, and corrects the non-hue-related data in each pixel of the second image based on the non-hue correction data of each hue-region.

17. The image processing device according to claim 15, wherein the first partial image extracting unit further comprises an extracting unit that extracts a divisional image having the smallest calculated variance or standard deviation as the first partial image when the variance or standard deviation for the divisional image having the smallest calculated variance or standard deviation is less than or equal to a prescribed value.

18. The image processing device according to claim 15, wherein the first partial image extracting unit further comprises an extracting unit extracting the first partial image in such a manner that when there is only one divisional image having variance or standard deviation less than or equal to the prescribed value, the extracting unit extracts the one divisional image as the first partial image, and when there is a plurality of divisional images having variances or standard deviations less than or equal to the prescribed value, the extracting unit extracts a preceding image which has been divided into the divisional images as the first partial image.

19. The image processing device according to claim 16, wherein the first hue-related data is calculated based on H values of the pixels in the first partial image defined in the HSV color space, and wherein the second hue-related data is calculated based on H values of the pixels in the second image defined in the HSV color space.

* * * * *